US011489720B1

(12) United States Patent
Kempanna et al.

(10) Patent No.: US 11,489,720 B1
(45) Date of Patent: Nov. 1, 2022

(54) METHOD AND APPARATUS TO EVALUATE RESOURCE ELEMENTS AND PUBLIC CLOUDS FOR DEPLOYING TENANT DEPLOYABLE ELEMENTS BASED ON HARVESTED PERFORMANCE METRICS

(71) Applicant: VMware, Inc., Palo Alto, CA (US)

(72) Inventors: Raghav Kempanna, Bangalore (IN); Rajagopal Sreenivasan, Bangalore (IN); Sudarshana Kandachar Sridhara Rao, Bangalore (IN); Kumara Parameshwaran, Bangalore (IN); Vipin Padmam Ramesh, Nagercoil (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/569,520

(22) Filed: Jan. 6, 2022

(30) Foreign Application Priority Data

Jun. 18, 2021 (IN) .............................. 202141027333
Jun. 18, 2021 (IN) .............................. 202141027388

(51) Int. Cl.
*G06F 15/177* (2006.01)
*H04L 41/0806* (2022.01)
(Continued)

(52) U.S. Cl.
CPC ...... *H04L 41/0806* (2013.01); *H04L 43/0811* (2013.01); *H04L 67/10* (2013.01)

(58) Field of Classification Search
None
See application file for complete search history.

(56) References Cited

U.S. PATENT DOCUMENTS 5,652,751 A 7/1997 Sharony
5,909,553 A 6/1999 Campbell et al.
(Continued)

FOREIGN PATENT DOCUMENTS

CN 1926809 A 3/2007
CN 102577270 A 7/2012
(Continued)

OTHER PUBLICATIONS

Alsaeedi, Mohammed, et al., "Toward Adaptive and Scalable OpenFlow-SDN Flow Control: A Survey," IEEE Access, Aug. 1, 2019, 34 pages, vol. 7, IEEE, retrieved from https://ieeexplore.ieee.org/document/8784036.

(Continued)

*Primary Examiner* — Quang N Nguyen
(74) *Attorney, Agent, or Firm* — ADELI LLP

(57) ABSTRACT

Some embodiments of the invention provide a method of deploying tenant deployable elements on resource elements in public cloud datacenters. The method receives a request to deploy a particular tenant deployable element in one of a first public cloud datacenter (PCD) and a second PCD, the first public cloud datacenter belonging to a first cloud service provider (CSP) and the second public cloud datacenter belonging to a second CSP. For each candidate resource element in the first PCD, the method identifies a first set of performance metrics associated with the candidate resource element. For each candidate resource element in the second PCD, the method identifies a second set of performance metrics associated with the candidate resource element. The method evaluates the identified first and second sets of metrics to select a resource element to implement the particular tenant deployable element in one of the first and second PCDs. The method uses the selected resource (Continued)

element to implement the particular tenant deployable element in one of the first and second PCDs.

19 Claims, 14 Drawing Sheets

(51) Int. Cl.
*H04L 67/10* (2022.01)
*H04L 43/0811* (2022.01)

(56) References Cited

U.S. PATENT DOCUMENTS

| | | | |
|---|---|---|---|
| 6,154,465 A | 11/2000 | Pickett | |
| 6,157,648 A | 12/2000 | Voit et al. | |
| 6,201,810 B1 | 3/2001 | Masuda et al. | |
| 6,363,378 B1 | 3/2002 | Conklin et al. | |
| 6,445,682 B1 | 9/2002 | Weitz | |
| 6,744,775 B1 | 6/2004 | Beshai et al. | |
| 6,976,087 B1 | 12/2005 | Westfall et al. | |
| 7,003,481 B2 | 2/2006 | Banka et al. | |
| 7,280,476 B2 | 10/2007 | Anderson | |
| 7,313,629 B1 | 12/2007 | Nucci et al. | |
| 7,320,017 B1 | 1/2008 | Kurapati et al. | |
| 7,373,660 B1 | 5/2008 | Guichard et al. | |
| 7,581,022 B1 | 8/2009 | Griffin et al. | |
| 7,680,925 B2 | 3/2010 | Sathyanarayana et al. | |
| 7,681,236 B2 | 3/2010 | Tamura et al. | |
| 7,962,458 B2 | 6/2011 | Holenstein et al. | |
| 8,094,575 B1 | 1/2012 | Vadlakonda et al. | |
| 8,094,659 B1 | 1/2012 | Arad | |
| 8,111,692 B2 | 2/2012 | Ray | |
| 8,141,156 B1 | 3/2012 | Mao et al. | |
| 8,224,971 B1 | 7/2012 | Miller et al. | |
| 8,228,928 B2 | 7/2012 | Parandekar et al. | |
| 8,243,589 B1 | 8/2012 | Trost et al. | |
| 8,259,566 B2 | 9/2012 | Chen et al. | |
| 8,274,891 B2 | 9/2012 | Averi et al. | |
| 8,301,749 B1 | 10/2012 | Finklestein et al. | |
| 8,385,227 B1 | 2/2013 | Downey | |
| 8,566,452 B1 | 10/2013 | Goodwin et al. | |
| 8,630,291 B2 | 1/2014 | Shaffer et al. | |
| 8,661,295 B1 | 2/2014 | Khanna et al. | |
| 8,724,456 B1 | 5/2014 | Hong et al. | |
| 8,724,503 B2 | 5/2014 | Johnsson et al. | |
| 8,745,177 B1 | 6/2014 | Kazerani et al. | |
| 8,799,504 B2 | 8/2014 | Capone et al. | |
| 8,804,745 B1 | 8/2014 | Sinn | |
| 8,806,482 B1 | 8/2014 | Nagargadde et al. | |
| 8,855,071 B1 | 10/2014 | Sankaran et al. | |
| 8,856,339 B2 | 10/2014 | Mestery et al. | |
| 8,964,548 B1 | 2/2015 | Keralapura et al. | |
| 8,989,199 B1 | 3/2015 | Sella et al. | |
| 9,009,217 B1 | 4/2015 | Nagargadde et al. | |
| 9,055,000 B1 | 6/2015 | Ghosh et al. | |
| 9,060,025 B2 | 6/2015 | Xu | |
| 9,071,607 B2 | 6/2015 | Twitchell, Jr. | |
| 9,075,771 B1 | 7/2015 | Gawali et al. | |
| 9,135,037 B1 | 9/2015 | Petrescu-Prahova et al. | |
| 9,137,334 B2 | 9/2015 | Zhou | |
| 9,154,327 B1 | 10/2015 | Marino et al. | |
| 9,203,764 B2 | 12/2015 | Shirazipour et al. | |
| 9,306,949 B1 | 4/2016 | Richard et al. | |
| 9,323,561 B2 | 4/2016 | Ayala et al. | |
| 9,336,040 B2 | 5/2016 | Dong et al. | |
| 9,354,983 B1 | 5/2016 | Yenamandra et al. | |
| 9,356,943 B1 | 5/2016 | Lopilato et al. | |
| 9,379,981 B1 | 6/2016 | Zhou et al. | |
| 9,413,724 B2 | 8/2016 | Xu | |
| 9,419,878 B2 | 8/2016 | Hsiao et al. | |
| 9,432,245 B1 | 8/2016 | Sorenson et al. | |
| 9,438,566 B2 | 9/2016 | Zhang et al. | |
| 9,450,817 B1 | 9/2016 | Bahadur et al. | |
| 9,450,852 B1 | 9/2016 | Chen et al. | |
| 9,462,010 B1 | 10/2016 | Stevenson | |
| 9,467,478 B1 | 10/2016 | Khan et al. | |
| 9,485,163 B1 | 11/2016 | Fries et al. | |
| 9,521,067 B2 | 12/2016 | Michael et al. | |
| 9,525,564 B2 | 12/2016 | Lee | |
| 9,559,951 B1 | 1/2017 | Sajassi et al. | |
| 9,563,423 B1 | 2/2017 | Pittman | |
| 9,602,389 B1 | 3/2017 | Maveli et al. | |
| 9,608,917 B1 | 3/2017 | Anderson et al. | |
| 9,608,962 B1 | 3/2017 | Chang | |
| 9,621,460 B2 | 4/2017 | Mehta et al. | |
| 9,641,551 B1 | 5/2017 | Kariyanahalli | |
| 9,648,547 B1 | 5/2017 | Hart et al. | |
| 9,665,432 B2 | 5/2017 | Kruse et al. | |
| 9,686,127 B2 | 6/2017 | Ramachandran et al. | |
| 9,715,401 B2 | 7/2017 | Devine et al. | |
| 9,717,021 B2 | 7/2017 | Hughes et al. | |
| 9,722,815 B2 | 8/2017 | Mukundan et al. | |
| 9,747,249 B2 | 8/2017 | Cherian et al. | |
| 9,755,965 B1 | 9/2017 | Yadav et al. | |
| 9,787,559 B1 | 10/2017 | Schroeder | |
| 9,807,004 B2 | 10/2017 | Koley et al. | |
| 9,819,540 B1 | 11/2017 | Bahadur et al. | |
| 9,819,565 B2 | 11/2017 | Djukic et al. | |
| 9,825,822 B1 | 11/2017 | Holland | |
| 9,825,911 B1 | 11/2017 | Brandwine | |
| 9,825,992 B2 | 11/2017 | Xu | |
| 9,832,128 B1 | 11/2017 | Ashner et al. | |
| 9,832,205 B2 | 11/2017 | Santhi et al. | |
| 9,875,355 B1 | 1/2018 | Williams | |
| 9,906,401 B1 | 2/2018 | Rao | |
| 9,930,011 B1 | 3/2018 | Clemons, Jr. et al. | |
| 9,935,829 B1 | 4/2018 | Miller et al. | |
| 9,942,787 B1 | 4/2018 | Tillotson | |
| 10,038,601 B1 | 7/2018 | Becker et al. | |
| 10,057,183 B2 | 8/2018 | Salle et al. | |
| 10,057,294 B2 | 8/2018 | Xu | |
| 10,135,789 B2 | 11/2018 | Mayya et al. | |
| 10,142,226 B1 | 11/2018 | Wu et al. | |
| 10,178,032 B1 | 1/2019 | Freitas | |
| 10,187,289 B1 | 1/2019 | Chen et al. | |
| 10,200,264 B2 | 2/2019 | Menon et al. | |
| 10,229,017 B1 | 3/2019 | Zou et al. | |
| 10,237,123 B2 | 3/2019 | Dubey et al. | |
| 10,250,498 B1 | 4/2019 | Bales et al. | |
| 10,263,832 B1 | 4/2019 | Ghosh | |
| 10,320,664 B2 | 6/2019 | Nainar et al. | |
| 10,320,691 B1 | 6/2019 | Matthews et al. | |
| 10,326,830 B1 | 6/2019 | Singh | |
| 10,348,767 B1 | 7/2019 | Lee et al. | |
| 10,355,989 B1 | 7/2019 | Panchal et al. | |
| 10,425,382 B2 | 9/2019 | Mayya et al. | |
| 10,454,708 B2 | 10/2019 | Mibu | |
| 10,454,714 B2 | 10/2019 | Mayya et al. | |
| 10,461,993 B2 | 10/2019 | Turabi et al. | |
| 10,498,652 B2 | 12/2019 | Mayya et al. | |
| 10,511,546 B2 | 12/2019 | Singarayan et al. | |
| 10,523,539 B2 | 12/2019 | Mayya et al. | |
| 10,550,093 B2 | 2/2020 | Ojima et al. | |
| 10,554,538 B2 | 2/2020 | Spohn et al. | |
| 10,560,431 B1 | 2/2020 | Chen et al. | |
| 10,565,464 B2 | 2/2020 | Han et al. | |
| 10,567,519 B1 | 2/2020 | Mukhopadhyaya et al. | |
| 10,574,528 B2 | 2/2020 | Mayya et al. | |
| 10,594,516 B2 * | 3/2020 | Cidon | H04L 41/0803 |
| 10,594,659 B2 | 3/2020 | El-Moussa et al. | |
| 10,608,844 B2 | 3/2020 | Cidon et al. | |
| 10,637,889 B2 | 4/2020 | Ermagan et al. | |
| 10,666,460 B2 | 5/2020 | Cidon et al. | |
| 10,666,497 B2 * | 5/2020 | Tahhan | H04L 69/40 |
| 10,686,625 B2 | 6/2020 | Cidon et al. | |
| 10,693,739 B1 | 6/2020 | Naseri et al. | |
| 10,749,711 B2 | 8/2020 | Mukundan et al. | |
| 10,778,466 B2 | 9/2020 | Cidon et al. | |
| 10,778,528 B2 | 9/2020 | Mayya et al. | |
| 10,805,114 B2 | 10/2020 | Cidon et al. | |
| 10,805,272 B2 | 10/2020 | Mayya et al. | |
| 10,819,564 B2 | 10/2020 | Turabi et al. | |
| 10,826,775 B1 | 11/2020 | Moreno et al. | |
| 10,841,131 B2 | 11/2020 | Cidon et al. | |

(56) References Cited

U.S. PATENT DOCUMENTS

| | | |
|---|---|---|
| 10,911,374 B1 | 2/2021 | Kumar et al. |
| 10,938,693 B2 | 3/2021 | Mayya et al. |
| 10,951,529 B2 | 3/2021 | Duan et al. |
| 10,958,479 B2 | 3/2021 | Cidon et al. |
| 10,959,098 B2 | 3/2021 | Cidon et al. |
| 10,992,558 B1 | 4/2021 | Silva et al. |
| 10,992,568 B2 | 4/2021 | Michael et al. |
| 10,999,100 B2 | 5/2021 | Cidon et al. |
| 10,999,137 B2 | 5/2021 | Cidon et al. |
| 10,999,165 B2 | 5/2021 | Cidon et al. |
| 11,005,684 B2 | 5/2021 | Cidon |
| 11,018,995 B2 | 5/2021 | Cidon et al. |
| 11,044,190 B2 | 6/2021 | Ramaswamy et al. |
| 11,050,588 B2 | 6/2021 | Mayya et al. |
| 11,050,644 B2 | 6/2021 | Hegde et al. |
| 11,071,005 B2 | 7/2021 | Shen et al. |
| 11,089,111 B2 | 8/2021 | Markuze et al. |
| 11,095,612 B1 | 8/2021 | Oswal et al. |
| 11,102,032 B2 | 8/2021 | Cidon et al. |
| 11,108,851 B1 | 8/2021 | Kurmala et al. |
| 11,115,347 B2 | 9/2021 | Gupta et al. |
| 11,115,426 B1 | 9/2021 | Pazhyannur et al. |
| 11,115,480 B2 | 9/2021 | Markuze et al. |
| 11,121,962 B2 | 9/2021 | Michael et al. |
| 11,121,985 B2 | 9/2021 | Cidon et al. |
| 11,128,492 B2 | 9/2021 | Sethi et al. |
| 11,153,230 B2 | 10/2021 | Cidon et al. |
| 11,171,885 B2 | 11/2021 | Cidon et al. |
| 11,212,140 B2 | 12/2021 | Mukundan et al. |
| 11,212,238 B2 | 12/2021 | Cidon et al. |
| 11,223,514 B2 | 1/2022 | Mayya et al. |
| 11,245,641 B2 | 2/2022 | Ramaswamy et al. |
| 11,252,079 B2 | 2/2022 | Michael et al. |
| 11,252,105 B2 | 2/2022 | Cidon et al. |
| 11,252,106 B2 | 2/2022 | Cidon et al. |
| 11,258,728 B2 | 2/2022 | Cidon et al. |
| 11,381,474 B1 | 7/2022 | Kumar et al. |
| 2002/0085488 A1 | 7/2002 | Kobayashi |
| 2002/0087716 A1 | 7/2002 | Mustafa |
| 2002/0198840 A1 | 12/2002 | Banka et al. |
| 2003/0061269 A1 | 3/2003 | Hathaway et al. |
| 2003/0088697 A1 | 5/2003 | Matsuhira |
| 2003/0112766 A1 | 6/2003 | Riedel et al. |
| 2003/0112808 A1 | 6/2003 | Solomon |
| 2003/0126468 A1 | 7/2003 | Markham |
| 2003/0161313 A1 | 8/2003 | Jinmei et al. |
| 2003/0189919 A1 | 10/2003 | Gupta et al. |
| 2003/0202506 A1 | 10/2003 | Perkins et al. |
| 2003/0219030 A1 | 11/2003 | Gubbi |
| 2004/0059831 A1 | 3/2004 | Chu et al. |
| 2004/0068668 A1 | 4/2004 | Lor et al. |
| 2004/0165601 A1 | 8/2004 | Liu et al. |
| 2004/0224771 A1 | 11/2004 | Chen et al. |
| 2005/0078690 A1 | 4/2005 | DeLangis |
| 2005/0154790 A1 | 7/2005 | Nagata et al. |
| 2005/0172161 A1 | 8/2005 | Cruz et al. |
| 2005/0195754 A1 | 9/2005 | Nosella |
| 2005/0265255 A1 | 12/2005 | Kodialam et al. |
| 2006/0002291 A1 | 1/2006 | Alicherry et al. |
| 2006/0114838 A1 | 6/2006 | Mandavilli et al. |
| 2006/0171365 A1 | 8/2006 | Borella |
| 2006/0182034 A1 | 8/2006 | Klinker et al. |
| 2006/0182035 A1 | 8/2006 | Vasseur |
| 2006/0193247 A1 | 8/2006 | Naseh et al. |
| 2006/0193252 A1 | 8/2006 | Naseh et al. |
| 2007/0064604 A1 | 3/2007 | Chen et al. |
| 2007/0064702 A1 | 3/2007 | Bates et al. |
| 2007/0083727 A1 | 4/2007 | Johnston et al. |
| 2007/0091794 A1 | 4/2007 | Filsfils et al. |
| 2007/0103548 A1 | 5/2007 | Carter |
| 2007/0115812 A1 | 5/2007 | Hughes |
| 2007/0121486 A1 | 5/2007 | Guichard et al. |
| 2007/0130325 A1 | 6/2007 | Lesser |
| 2007/0162639 A1 | 7/2007 | Chu et al. |
| 2007/0177511 A1 | 8/2007 | Das et al. |
| 2007/0237081 A1 | 10/2007 | Kodialam et al. |
| 2007/0260746 A1 | 11/2007 | Mirtorabi et al. |
| 2007/0268882 A1 | 11/2007 | Breslau et al. |
| 2008/0002670 A1 | 1/2008 | Bugenhagen et al. |
| 2008/0049621 A1 | 2/2008 | McGuire et al. |
| 2008/0055241 A1 | 3/2008 | Goldenberg et al. |
| 2008/0080509 A1 | 4/2008 | Khanna et al. |
| 2008/0095187 A1 | 4/2008 | Jung et al. |
| 2008/0117930 A1 | 5/2008 | Chakareski et al. |
| 2008/0144532 A1 | 6/2008 | Chamarajanagar et al. |
| 2008/0181116 A1 | 7/2008 | Kavanaugh et al. |
| 2008/0219276 A1 | 9/2008 | Shah |
| 2008/0240121 A1 | 10/2008 | Xiong et al. |
| 2009/0013210 A1 | 1/2009 | McIntosh et al. |
| 2009/0125617 A1 | 5/2009 | Kiessig et al. |
| 2009/0141642 A1 | 6/2009 | Sun |
| 2009/0154463 A1 | 6/2009 | Hines et al. |
| 2009/0247204 A1 | 10/2009 | Sennett et al. |
| 2009/0274045 A1 | 11/2009 | Meier et al. |
| 2009/0276657 A1 | 11/2009 | Wetmore et al. |
| 2009/0303880 A1 | 12/2009 | Maltz et al. |
| 2010/0008361 A1 | 1/2010 | Guichard et al. |
| 2010/0017802 A1 | 1/2010 | Lojewski |
| 2010/0046532 A1 | 2/2010 | Okita |
| 2010/0061379 A1 | 3/2010 | Parandekar et al. |
| 2010/0080129 A1 | 4/2010 | Strahan et al. |
| 2010/0088440 A1 | 4/2010 | Banks et al. |
| 2010/0091823 A1 | 4/2010 | Retana et al. |
| 2010/0107162 A1 | 4/2010 | Edwards et al. |
| 2010/0118727 A1 | 5/2010 | Draves et al. |
| 2010/0118886 A1 | 5/2010 | Saavedra |
| 2010/0165985 A1 | 7/2010 | Sharma et al. |
| 2010/0191884 A1 | 7/2010 | Holenstein et al. |
| 2010/0223621 A1 | 9/2010 | Joshi et al. |
| 2010/0226246 A1 | 9/2010 | Proulx |
| 2010/0290422 A1 | 11/2010 | Haigh et al. |
| 2010/0309841 A1 | 12/2010 | Conte |
| 2010/0309912 A1 | 12/2010 | Mehta et al. |
| 2010/0322255 A1 | 12/2010 | Hao et al. |
| 2010/0332657 A1 | 12/2010 | Elyashev et al. |
| 2011/0007752 A1 | 1/2011 | Silva et al. |
| 2011/0032939 A1 | 2/2011 | Nozaki et al. |
| 2011/0040814 A1 | 2/2011 | Higgins |
| 2011/0075674 A1 | 3/2011 | Li et al. |
| 2011/0107139 A1 | 5/2011 | Middlecamp et al. |
| 2011/0110370 A1 | 5/2011 | Moreno et al. |
| 2011/0141877 A1 | 6/2011 | Xu et al. |
| 2011/0142041 A1 | 6/2011 | Imai |
| 2011/0153909 A1 | 6/2011 | Dong |
| 2011/0235509 A1 | 9/2011 | Szymanski |
| 2011/0255397 A1 | 10/2011 | Kadakia et al. |
| 2012/0008630 A1 | 1/2012 | Ould-Brahim |
| 2012/0027013 A1 | 2/2012 | Napierala |
| 2012/0136697 A1 | 5/2012 | Peles et al. |
| 2012/0157068 A1 | 6/2012 | Eichen et al. |
| 2012/0173694 A1 | 7/2012 | Yan et al. |
| 2012/0173919 A1 | 7/2012 | Patel et al. |
| 2012/0182940 A1 | 7/2012 | Taleb et al. |
| 2012/0221955 A1 | 8/2012 | Raleigh et al. |
| 2012/0227093 A1 | 9/2012 | Shalzkamer et al. |
| 2012/0250682 A1 | 10/2012 | Vincent et al. |
| 2012/0250686 A1 | 10/2012 | Vincent et al. |
| 2012/0281706 A1 | 11/2012 | Agarwal et al. |
| 2012/0287818 A1 | 11/2012 | Corti et al. |
| 2012/0300615 A1 | 11/2012 | Kempf et al. |
| 2012/0307659 A1 | 12/2012 | Yamada |
| 2012/0317270 A1 | 12/2012 | Vrbaski et al. |
| 2012/0317291 A1 | 12/2012 | Wolfe |
| 2013/0019005 A1 | 1/2013 | Hui et al. |
| 2013/0021968 A1 | 1/2013 | Reznik et al. |
| 2013/0044764 A1 | 2/2013 | Casado et al. |
| 2013/0051237 A1 | 2/2013 | Ong |
| 2013/0051399 A1 | 2/2013 | Zhang et al. |
| 2013/0054763 A1 | 2/2013 | Merwe et al. |
| 2013/0086267 A1 | 4/2013 | Gelenbe et al. |
| 2013/0097304 A1* | 4/2013 | Asthana .......... H04L 41/5006 709/224 |
| 2013/0103834 A1 | 4/2013 | Dzerve et al. |
| 2013/0124718 A1 | 5/2013 | Griffith et al. |

(56) References Cited

U.S. PATENT DOCUMENTS

| | | |
|---|---|---|
| 2013/0124911 A1 | 5/2013 | Griffith et al. |
| 2013/0124912 A1 | 5/2013 | Griffith et al. |
| 2013/0128889 A1 | 5/2013 | Mathur et al. |
| 2013/0142201 A1 | 6/2013 | Kim et al. |
| 2013/0170354 A1 | 7/2013 | Takashima et al. |
| 2013/0173788 A1 | 7/2013 | Song |
| 2013/0182712 A1 | 7/2013 | Aguayo et al. |
| 2013/0185729 A1* | 7/2013 | Vasic .................. G06F 9/5072 718/104 |
| 2013/0191688 A1 | 7/2013 | Agarwal et al. |
| 2013/0238782 A1 | 9/2013 | Zhao et al. |
| 2013/0242718 A1 | 9/2013 | Zhang |
| 2013/0254599 A1 | 9/2013 | Katkar et al. |
| 2013/0258839 A1 | 10/2013 | Wang et al. |
| 2013/0258847 A1 | 10/2013 | Zhang et al. |
| 2013/0266015 A1 | 10/2013 | Qu et al. |
| 2013/0266019 A1 | 10/2013 | Qu et al. |
| 2013/0283364 A1 | 10/2013 | Chang et al. |
| 2013/0286846 A1 | 10/2013 | Atlas et al. |
| 2013/0297611 A1 | 11/2013 | Moritz et al. |
| 2013/0297770 A1 | 11/2013 | Zhang |
| 2013/0301469 A1 | 11/2013 | Suga |
| 2013/0301642 A1 | 11/2013 | Radhakrishnan et al. |
| 2013/0308444 A1 | 11/2013 | Sem-Jacobsen et al. |
| 2013/0315242 A1 | 11/2013 | Wang et al. |
| 2013/0315243 A1 | 11/2013 | Huang et al. |
| 2013/0329548 A1 | 12/2013 | Nakil et al. |
| 2013/0329601 A1 | 12/2013 | Yin et al. |
| 2013/0329734 A1 | 12/2013 | Chesla et al. |
| 2013/0346470 A1 | 12/2013 | Obstfeld et al. |
| 2014/0019604 A1 | 1/2014 | Twitchell, Jr. |
| 2014/0019750 A1 | 1/2014 | Dodgson et al. |
| 2014/0040975 A1 | 2/2014 | Raleigh et al. |
| 2014/0064283 A1 | 3/2014 | Balus et al. |
| 2014/0071832 A1 | 3/2014 | Johnsson et al. |
| 2014/0092907 A1 | 4/2014 | Sridhar et al. |
| 2014/0108665 A1 | 4/2014 | Arora et al. |
| 2014/0112171 A1 | 4/2014 | Pasdar |
| 2014/0115584 A1 | 4/2014 | Mudigonda et al. |
| 2014/0123135 A1 | 5/2014 | Huang et al. |
| 2014/0126418 A1 | 5/2014 | Brendel et al. |
| 2014/0156818 A1 | 6/2014 | Hunt |
| 2014/0156823 A1 | 6/2014 | Liu et al. |
| 2014/0164560 A1 | 6/2014 | Ko et al. |
| 2014/0164617 A1 | 6/2014 | Jalan et al. |
| 2014/0173113 A1 | 6/2014 | Vemuri et al. |
| 2014/0173331 A1 | 6/2014 | Martin et al. |
| 2014/0181824 A1 | 6/2014 | Saund et al. |
| 2014/0208317 A1 | 7/2014 | Nakagawa |
| 2014/0219135 A1 | 8/2014 | Li et al. |
| 2014/0223507 A1 | 8/2014 | Xu |
| 2014/0229210 A1 | 8/2014 | Sharifian et al. |
| 2014/0244851 A1 | 8/2014 | Lee |
| 2014/0258535 A1 | 9/2014 | Zhang |
| 2014/0269690 A1 | 9/2014 | Tu |
| 2014/0279862 A1 | 9/2014 | Dietz et al. |
| 2014/0280499 A1 | 9/2014 | Basavaiah et al. |
| 2014/0317440 A1 | 10/2014 | Biermayr et al. |
| 2014/0321277 A1 | 10/2014 | Lynn, Jr. et al. |
| 2014/0337500 A1 | 11/2014 | Lee |
| 2014/0341109 A1 | 11/2014 | Cartmell et al. |
| 2014/0372582 A1 | 12/2014 | Ghanwani et al. |
| 2015/0003240 A1 | 1/2015 | Drwiega et al. |
| 2015/0016249 A1 | 1/2015 | Mukundan et al. |
| 2015/0029864 A1 | 1/2015 | Raileanu et al. |
| 2015/0039744 A1 | 2/2015 | Niazi et al. |
| 2015/0046572 A1 | 2/2015 | Cheng et al. |
| 2015/0052247 A1 | 2/2015 | Threefoot et al. |
| 2015/0052517 A1 | 2/2015 | Raghu et al. |
| 2015/0056960 A1 | 2/2015 | Egner et al. |
| 2015/0058917 A1 | 2/2015 | Xu |
| 2015/0088942 A1 | 3/2015 | Shah |
| 2015/0089628 A1 | 3/2015 | Lang |
| 2015/0092603 A1 | 4/2015 | Aguayo et al. |
| 2015/0096011 A1 | 4/2015 | Watt |
| 2015/0124603 A1 | 5/2015 | Ketheesan et al. |
| 2015/0134777 A1 | 5/2015 | Onoue |
| 2015/0139238 A1 | 5/2015 | Pourzandi et al. |
| 2015/0146539 A1 | 5/2015 | Mehta et al. |
| 2015/0163152 A1 | 6/2015 | Li |
| 2015/0169340 A1 | 6/2015 | Haddad et al. |
| 2015/0172121 A1 | 6/2015 | Farkas et al. |
| 2015/0172169 A1 | 6/2015 | DeCusatis et al. |
| 2015/0188823 A1 | 7/2015 | Williams et al. |
| 2015/0189009 A1 | 7/2015 | Bemmel |
| 2015/0195178 A1 | 7/2015 | Bhattacharya et al. |
| 2015/0201036 A1 | 7/2015 | Nishiki et al. |
| 2015/0222543 A1 | 8/2015 | Song |
| 2015/0222638 A1 | 8/2015 | Morley |
| 2015/0236945 A1 | 8/2015 | Michael et al. |
| 2015/0236962 A1 | 8/2015 | Veres et al. |
| 2015/0244617 A1 | 8/2015 | Nakil et al. |
| 2015/0249644 A1 | 9/2015 | Xu |
| 2015/0257081 A1 | 9/2015 | Ramanujan et al. |
| 2015/0271056 A1 | 9/2015 | Chunduri et al. |
| 2015/0271104 A1 | 9/2015 | Chikkamath et al. |
| 2015/0271303 A1 | 9/2015 | Neginhal et al. |
| 2015/0281004 A1 | 10/2015 | Kakadia et al. |
| 2015/0312142 A1 | 10/2015 | Barabash et al. |
| 2015/0312760 A1 | 10/2015 | O'Toole |
| 2015/0317169 A1 | 11/2015 | Sinha et al. |
| 2015/0334025 A1 | 11/2015 | Rader |
| 2015/0334696 A1 | 11/2015 | Gu et al. |
| 2015/0341271 A1 | 11/2015 | Gomez |
| 2015/0349978 A1 | 12/2015 | Wu et al. |
| 2015/0350907 A1 | 12/2015 | Timariu et al. |
| 2015/0358236 A1 | 12/2015 | Roach et al. |
| 2015/0363221 A1 | 12/2015 | Terayama et al. |
| 2015/0363733 A1 | 12/2015 | Brown |
| 2015/0365323 A1 | 12/2015 | Duminuco et al. |
| 2015/0372943 A1 | 12/2015 | Hasan et al. |
| 2015/0372982 A1 | 12/2015 | Herle et al. |
| 2015/0381407 A1 | 12/2015 | Wang et al. |
| 2015/0381493 A1 | 12/2015 | Bansal et al. |
| 2016/0020844 A1 | 1/2016 | Hart et al. |
| 2016/0021597 A1 | 1/2016 | Hart et al. |
| 2016/0035183 A1 | 2/2016 | Buchholz et al. |
| 2016/0036924 A1 | 2/2016 | Koppolu et al. |
| 2016/0036938 A1 | 2/2016 | Aviles et al. |
| 2016/0037434 A1 | 2/2016 | Gopal et al. |
| 2016/0072669 A1 | 3/2016 | Saavedra |
| 2016/0072684 A1 | 3/2016 | Manuguri et al. |
| 2016/0080502 A1 | 3/2016 | Yadav et al. |
| 2016/0105353 A1 | 4/2016 | Cociglio |
| 2016/0105392 A1 | 4/2016 | Thakkar et al. |
| 2016/0105471 A1 | 4/2016 | Nunes et al. |
| 2016/0105488 A1 | 4/2016 | Thakkar et al. |
| 2016/0117185 A1 | 4/2016 | Fang et al. |
| 2016/0134461 A1 | 5/2016 | Sampath et al. |
| 2016/0134528 A1 | 5/2016 | Lin et al. |
| 2016/0134591 A1 | 5/2016 | Liao et al. |
| 2016/0142373 A1 | 5/2016 | Ossipov |
| 2016/0150055 A1 | 5/2016 | Choi |
| 2016/0164832 A1 | 6/2016 | Bellagamba et al. |
| 2016/0164914 A1 | 6/2016 | Madhav et al. |
| 2016/0173338 A1 | 6/2016 | Wolting |
| 2016/0191363 A1 | 6/2016 | Haraszti et al. |
| 2016/0191374 A1 | 6/2016 | Singh et al. |
| 2016/0192403 A1 | 6/2016 | Gupta et al. |
| 2016/0197834 A1 | 7/2016 | Luft |
| 2016/0197835 A1 | 7/2016 | Luft |
| 2016/0198003 A1 | 7/2016 | Luft |
| 2016/0210209 A1 | 7/2016 | Verkaik et al. |
| 2016/0212773 A1 | 7/2016 | Kanderholm et al. |
| 2016/0218947 A1 | 7/2016 | Hughes et al. |
| 2016/0218951 A1 | 7/2016 | Masseur et al. |
| 2016/0255169 A1 | 9/2016 | Kovvuri et al. |
| 2016/0261493 A1 | 9/2016 | Li |
| 2016/0261495 A1 | 9/2016 | Xia et al. |
| 2016/0261506 A1 | 9/2016 | Hegde et al. |
| 2016/0261639 A1 | 9/2016 | Xu |
| 2016/0269298 A1 | 9/2016 | Li et al. |
| 2016/0269926 A1 | 9/2016 | Sundaram |
| 2016/0285736 A1 | 9/2016 | Gu |

(56) References Cited

U.S. PATENT DOCUMENTS

| | | |
|---|---|---|
| 2016/0308762 A1 | 10/2016 | Teng et al. |
| 2016/0315912 A1 | 10/2016 | Mayya et al. |
| 2016/0323377 A1 | 11/2016 | Einkauf et al. |
| 2016/0328159 A1 | 11/2016 | Coddington et al. |
| 2016/0330111 A1 | 11/2016 | Manghirmalani et al. |
| 2016/0352588 A1 | 12/2016 | Subbarayan et al. |
| 2016/0353268 A1 | 12/2016 | Senarath et al. |
| 2016/0359738 A1 | 12/2016 | Sullenberger et al. |
| 2016/0366187 A1 | 12/2016 | Kamble |
| 2016/0371153 A1 | 12/2016 | Dornemann |
| 2016/0380886 A1 | 12/2016 | Blair et al. |
| 2016/0380906 A1 | 12/2016 | Hodique et al. |
| 2017/0005986 A1 | 1/2017 | Bansal et al. |
| 2017/0006499 A1 | 1/2017 | Hampel et al. |
| 2017/0012870 A1 | 1/2017 | Blair et al. |
| 2017/0019428 A1 | 1/2017 | Cohn |
| 2017/0026283 A1 | 1/2017 | Williams et al. |
| 2017/0026355 A1 | 1/2017 | Mathaiyan et al. |
| 2017/0034046 A1 | 2/2017 | Cai et al. |
| 2017/0034052 A1 | 2/2017 | Chanda et al. |
| 2017/0034129 A1 | 2/2017 | Sawant et al. |
| 2017/0048296 A1 | 2/2017 | Ramalho et al. |
| 2017/0053258 A1 | 2/2017 | Carney et al. |
| 2017/0055131 A1 | 2/2017 | Kong et al. |
| 2017/0063674 A1 | 3/2017 | Maskalik et al. |
| 2017/0063782 A1 | 3/2017 | Jain et al. |
| 2017/0063794 A1 | 3/2017 | Jain et al. |
| 2017/0064005 A1 | 3/2017 | Lee |
| 2017/0093625 A1 | 3/2017 | Pera et al. |
| 2017/0097841 A1 | 4/2017 | Chang et al. |
| 2017/0104653 A1 | 4/2017 | Badea et al. |
| 2017/0104755 A1 | 4/2017 | Arregoces et al. |
| 2017/0109212 A1 | 4/2017 | Gaurav et al. |
| 2017/0118173 A1 | 4/2017 | Arramreddy et al. |
| 2017/0123939 A1 | 5/2017 | Maheshwari et al. |
| 2017/0126516 A1 | 5/2017 | Tiagi et al. |
| 2017/0126564 A1 | 5/2017 | Mayya et al. |
| 2017/0134186 A1 | 5/2017 | Mukundan et al. |
| 2017/0134520 A1 | 5/2017 | Abbasi et al. |
| 2017/0139789 A1 | 5/2017 | Fries et al. |
| 2017/0142000 A1 | 5/2017 | Cai et al. |
| 2017/0149637 A1 | 5/2017 | Banikazemi et al. |
| 2017/0155557 A1 | 6/2017 | Desai et al. |
| 2017/0163473 A1 | 6/2017 | Sadana et al. |
| 2017/0171310 A1 | 6/2017 | Gardner |
| 2017/0180220 A1* | 6/2017 | Leckey ............... H04L 41/122 |
| 2017/0181210 A1 | 6/2017 | Nadella et al. |
| 2017/0195161 A1 | 7/2017 | Ruel et al. |
| 2017/0195169 A1 | 7/2017 | Mills et al. |
| 2017/0201585 A1 | 7/2017 | Doraiswamy et al. |
| 2017/0207976 A1 | 7/2017 | Rovner et al. |
| 2017/0214545 A1 | 7/2017 | Cheng et al. |
| 2017/0214701 A1 | 7/2017 | Hasan |
| 2017/0223117 A1 | 8/2017 | Messerli et al. |
| 2017/0237710 A1 | 8/2017 | Mayya et al. |
| 2017/0257260 A1 | 9/2017 | Govindan et al. |
| 2017/0257309 A1 | 9/2017 | Appanna |
| 2017/0264496 A1 | 9/2017 | Ao et al. |
| 2017/0279717 A1 | 9/2017 | Bethers et al. |
| 2017/0279803 A1 | 9/2017 | Desai et al. |
| 2017/0280474 A1 | 9/2017 | Vesterinen et al. |
| 2017/0288987 A1 | 10/2017 | Pasupathy et al. |
| 2017/0289002 A1 | 10/2017 | Ganguli et al. |
| 2017/0295264 A1 | 10/2017 | Touitou et al. |
| 2017/0302565 A1 | 10/2017 | Ghobadi et al. |
| 2017/0310641 A1 | 10/2017 | Jiang et al. |
| 2017/0310691 A1 | 10/2017 | Vasseur et al. |
| 2017/0317954 A1 | 11/2017 | Masurekar et al. |
| 2017/0317969 A1 | 11/2017 | Masurekar et al. |
| 2017/0317974 A1 | 11/2017 | Masurekar et al. |
| 2017/0337086 A1 | 11/2017 | Zhu et al. |
| 2017/0339054 A1 | 11/2017 | Yadav et al. |
| 2017/0339070 A1 | 11/2017 | Chang et al. |
| 2017/0364419 A1 | 12/2017 | Lo |
| 2017/0366445 A1 | 12/2017 | Nemirovsky et al. |
| 2017/0366467 A1 | 12/2017 | Martin et al. |
| 2017/0373950 A1 | 12/2017 | Szilagyi |
| 2017/0374174 A1 | 12/2017 | Evens et al. |
| 2018/0006995 A1 | 1/2018 | Bickhart et al. |
| 2018/0007005 A1 | 1/2018 | Chanda et al. |
| 2018/0007123 A1 | 1/2018 | Cheng et al. |
| 2018/0013636 A1 | 1/2018 | Seetharamaiah et al. |
| 2018/0014051 A1 | 1/2018 | Phillips et al. |
| 2018/0020035 A1 | 1/2018 | Boggia et al. |
| 2018/0034668 A1 | 2/2018 | Mayya et al. |
| 2018/0041425 A1 | 2/2018 | Zhang |
| 2018/0062875 A1 | 3/2018 | Tumuluru |
| 2018/0062914 A1 | 3/2018 | Boutros et al. |
| 2018/0062917 A1 | 3/2018 | Chandrashekhar et al. |
| 2018/0063036 A1 | 3/2018 | Chandrashekhar et al. |
| 2018/0063193 A1 | 3/2018 | Chandrashekhar et al. |
| 2018/0063233 A1 | 3/2018 | Park |
| 2018/0063743 A1 | 3/2018 | Tumuluru et al. |
| 2018/0069924 A1 | 3/2018 | Tumuluru et al. |
| 2018/0074909 A1 | 3/2018 | Bishop et al. |
| 2018/0077081 A1 | 3/2018 | Lauer et al. |
| 2018/0077202 A1 | 3/2018 | Xu |
| 2018/0084081 A1 | 3/2018 | Kuchibhotla et al. |
| 2018/0097725 A1 | 4/2018 | Wood et al. |
| 2018/0114569 A1 | 4/2018 | Strachan et al. |
| 2018/0123910 A1 | 5/2018 | Fitzgibbon |
| 2018/0131608 A1 | 5/2018 | Jiang et al. |
| 2018/0131615 A1 | 5/2018 | Zhang |
| 2018/0131720 A1 | 5/2018 | Hobson et al. |
| 2018/0145899 A1 | 5/2018 | Rao |
| 2018/0159796 A1 | 6/2018 | Wang et al. |
| 2018/0159856 A1 | 6/2018 | Gujarathi |
| 2018/0167378 A1 | 6/2018 | Kostyukov et al. |
| 2018/0176073 A1 | 6/2018 | Dubey et al. |
| 2018/0176082 A1 | 6/2018 | Katz et al. |
| 2018/0176130 A1 | 6/2018 | Banerjee et al. |
| 2018/0213472 A1 | 7/2018 | Ishii et al. |
| 2018/0219765 A1 | 8/2018 | Michael et al. |
| 2018/0219766 A1 | 8/2018 | Michael et al. |
| 2018/0234300 A1 | 8/2018 | Mayya et al. |
| 2018/0260125 A1 | 9/2018 | Botes et al. |
| 2018/0262468 A1 | 9/2018 | Kumar et al. |
| 2018/0270104 A1 | 9/2018 | Zheng et al. |
| 2018/0278541 A1 | 9/2018 | Wu et al. |
| 2018/0287907 A1 | 10/2018 | Kulshreshtha et al. |
| 2018/0295101 A1 | 10/2018 | Gehrmann |
| 2018/0295529 A1 | 10/2018 | Jen et al. |
| 2018/0302286 A1 | 10/2018 | Mayya et al. |
| 2018/0302321 A1 | 10/2018 | Manthiramoorthy et al. |
| 2018/0307851 A1 | 10/2018 | Lewis |
| 2018/0316606 A1 | 11/2018 | Sung et al. |
| 2018/0351855 A1 | 12/2018 | Sood et al. |
| 2018/0351862 A1 | 12/2018 | Jeganathan et al. |
| 2018/0351863 A1 | 12/2018 | Vairavakkalai et al. |
| 2018/0351882 A1 | 12/2018 | Jeganathan et al. |
| 2018/0367445 A1 | 12/2018 | Bajaj |
| 2018/0373558 A1 | 12/2018 | Chang et al. |
| 2018/0375744 A1 | 12/2018 | Mayya et al. |
| 2018/0375824 A1 | 12/2018 | Mayya et al. |
| 2018/0375967 A1 | 12/2018 | Pithawala et al. |
| 2019/0013883 A1 | 1/2019 | Vargas et al. |
| 2019/0014038 A1 | 1/2019 | Ritchie |
| 2019/0020588 A1 | 1/2019 | Twitchell, Jr. |
| 2019/0020627 A1 | 1/2019 | Yuan |
| 2019/0028378 A1 | 1/2019 | Houjyo et al. |
| 2019/0028552 A1 | 1/2019 | Johnson et al. |
| 2019/0036808 A1 | 1/2019 | Shenoy et al. |
| 2019/0036810 A1 | 1/2019 | Michael et al. |
| 2019/0036813 A1 | 1/2019 | Shenoy et al. |
| 2019/0046056 A1 | 2/2019 | Khachaturian et al. |
| 2019/0058657 A1 | 2/2019 | Chunduri et al. |
| 2019/0058709 A1 | 2/2019 | Kempf et al. |
| 2019/0068470 A1 | 2/2019 | Mirsky |
| 2019/0068493 A1 | 2/2019 | Ram et al. |
| 2019/0068500 A1 | 2/2019 | Hira |
| 2019/0075083 A1 | 3/2019 | Mayya et al. |
| 2019/0103990 A1 | 4/2019 | Cidon et al. |
| 2019/0103991 A1 | 4/2019 | Cidon et al. |
| 2019/0103992 A1 | 4/2019 | Cidon et al. |

(56) References Cited

U.S. PATENT DOCUMENTS

| | | |
|---|---|---|
| 2019/0103993 A1 | 4/2019 | Cidon et al. |
| 2019/0104035 A1 | 4/2019 | Cidon et al. |
| 2019/0104049 A1 | 4/2019 | Cidon et al. |
| 2019/0104050 A1 | 4/2019 | Cidon et al. |
| 2019/0104051 A1 | 4/2019 | Cidon et al. |
| 2019/0104052 A1 | 4/2019 | Cidon et al. |
| 2019/0104053 A1 | 4/2019 | Cidon et al. |
| 2019/0104063 A1 | 4/2019 | Cidon et al. |
| 2019/0104064 A1 | 4/2019 | Cidon et al. |
| 2019/0104109 A1 | 4/2019 | Cidon et al. |
| 2019/0104111 A1 | 4/2019 | Cidon et al. |
| 2019/0104413 A1 | 4/2019 | Cidon et al. |
| 2019/0109769 A1 | 4/2019 | Jain et al. |
| 2019/0132221 A1 | 5/2019 | Boutros et al. |
| 2019/0140889 A1 | 5/2019 | Mayya et al. |
| 2019/0140890 A1 | 5/2019 | Mayya et al. |
| 2019/0158371 A1 | 5/2019 | Dillon et al. |
| 2019/0158605 A1 | 5/2019 | Markuze et al. |
| 2019/0199539 A1 | 6/2019 | Deng et al. |
| 2019/0220703 A1 | 7/2019 | Prakash et al. |
| 2019/0238364 A1 | 8/2019 | Boutros et al. |
| 2019/0238446 A1 | 8/2019 | Barzik et al. |
| 2019/0238449 A1 | 8/2019 | Michael et al. |
| 2019/0238450 A1 | 8/2019 | Michael et al. |
| 2019/0238483 A1 | 8/2019 | Marichetty et al. |
| 2019/0268421 A1 | 8/2019 | Markuze et al. |
| 2019/0268973 A1 | 8/2019 | Bull et al. |
| 2019/0280962 A1 | 9/2019 | Michael et al. |
| 2019/0280963 A1 | 9/2019 | Michael et al. |
| 2019/0280964 A1 | 9/2019 | Michael et al. |
| 2019/0306197 A1 | 10/2019 | Degioanni |
| 2019/0313907 A1 | 10/2019 | Khachaturian et al. |
| 2019/0319847 A1 | 10/2019 | Nahar et al. |
| 2019/0334813 A1 | 10/2019 | Raj et al. |
| 2019/0334820 A1 | 10/2019 | Zhao |
| 2019/0342219 A1 | 11/2019 | Liu et al. |
| 2019/0356736 A1 | 11/2019 | Narayanaswamy et al. |
| 2019/0364099 A1 | 11/2019 | Thakkar et al. |
| 2019/0364456 A1 | 11/2019 | Yu |
| 2019/0372888 A1 | 12/2019 | Michael et al. |
| 2019/0372889 A1 | 12/2019 | Michael et al. |
| 2019/0372890 A1 | 12/2019 | Michael et al. |
| 2019/0394081 A1* | 12/2019 | Tahhan .................. H04L 67/10 |
| 2020/0014609 A1 | 1/2020 | Hockett et al. |
| 2020/0014615 A1 | 1/2020 | Michael et al. |
| 2020/0014616 A1 | 1/2020 | Michael et al. |
| 2020/0014661 A1 | 1/2020 | Mayya et al. |
| 2020/0014663 A1 | 1/2020 | Chen et al. |
| 2020/0021514 A1 | 1/2020 | Michael et al. |
| 2020/0021515 A1 | 1/2020 | Michael et al. |
| 2020/0036624 A1 | 1/2020 | Michael et al. |
| 2020/0044943 A1 | 2/2020 | Bor-Yaliniz et al. |
| 2020/0059420 A1 | 2/2020 | Abraham |
| 2020/0059459 A1 | 2/2020 | Abraham et al. |
| 2020/0092207 A1 | 3/2020 | Sipra et al. |
| 2020/0097327 A1 | 3/2020 | Beyer et al. |
| 2020/0099659 A1 | 3/2020 | Cometto et al. |
| 2020/0106696 A1 | 4/2020 | Michael et al. |
| 2020/0106706 A1 | 4/2020 | Mayya et al. |
| 2020/0119952 A1 | 4/2020 | Mayya et al. |
| 2020/0127905 A1 | 4/2020 | Mayya et al. |
| 2020/0127911 A1 | 4/2020 | Gilson et al. |
| 2020/0153701 A1 | 5/2020 | Mohan et al. |
| 2020/0153736 A1 | 5/2020 | Liebherr et al. |
| 2020/0162407 A1 | 5/2020 | Tillotson |
| 2020/0169473 A1 | 5/2020 | Rimar et al. |
| 2020/0177503 A1 | 6/2020 | Hooda et al. |
| 2020/0177550 A1 | 6/2020 | Valluri et al. |
| 2020/0177629 A1 | 6/2020 | Hooda et al. |
| 2020/0186471 A1 | 6/2020 | Shen et al. |
| 2020/0195557 A1 | 6/2020 | Duan et al. |
| 2020/0204460 A1 | 6/2020 | Schneider et al. |
| 2020/0213212 A1 | 7/2020 | Dillon et al. |
| 2020/0213224 A1 | 7/2020 | Cheng et al. |
| 2020/0218558 A1 | 7/2020 | Sreenath et al. |
| 2020/0235990 A1 | 7/2020 | Janakiraman et al. |
| 2020/0235999 A1 | 7/2020 | Mayya et al. |
| 2020/0236046 A1 | 7/2020 | Jain et al. |
| 2020/0244721 A1 | 7/2020 | S et al. |
| 2020/0252234 A1 | 8/2020 | Ramamoorthi et al. |
| 2020/0259700 A1 | 8/2020 | Bhalla et al. |
| 2020/0267184 A1 | 8/2020 | Vera-Schockner |
| 2020/0280587 A1 | 9/2020 | Janakiraman et al. |
| 2020/0287819 A1 | 9/2020 | Theogaraj et al. |
| 2020/0287976 A1 | 9/2020 | Theogaraj et al. |
| 2020/0296011 A1 | 9/2020 | Jain et al. |
| 2020/0296026 A1 | 9/2020 | Michael et al. |
| 2020/0314006 A1 | 10/2020 | Mackie et al. |
| 2020/0314614 A1 | 10/2020 | Moustafa et al. |
| 2020/0322230 A1 | 10/2020 | Natal et al. |
| 2020/0336336 A1 | 10/2020 | Sethi et al. |
| 2020/0344143 A1 | 10/2020 | Faseela et al. |
| 2020/0344163 A1 | 10/2020 | Gupta et al. |
| 2020/0351188 A1 | 11/2020 | Arora et al. |
| 2020/0358878 A1 | 11/2020 | Bansal et al. |
| 2020/0366530 A1 | 11/2020 | Mukundan et al. |
| 2020/0366562 A1 | 11/2020 | Mayya et al. |
| 2020/0382345 A1 | 12/2020 | Zhao et al. |
| 2020/0382387 A1 | 12/2020 | Pasupathy et al. |
| 2020/0412576 A1 | 12/2020 | Kondapavuluru et al. |
| 2020/0413283 A1 | 12/2020 | Shen et al. |
| 2021/0006482 A1 | 1/2021 | Hwang et al. |
| 2021/0006490 A1 | 1/2021 | Michael et al. |
| 2021/0029019 A1 | 1/2021 | Kottapalli |
| 2021/0029088 A1 | 1/2021 | Mayya et al. |
| 2021/0036888 A1 | 2/2021 | Makkalla et al. |
| 2021/0036987 A1 | 2/2021 | Mishra et al. |
| 2021/0067372 A1 | 3/2021 | Cidon et al. |
| 2021/0067373 A1 | 3/2021 | Cidon et al. |
| 2021/0067374 A1 | 3/2021 | Cidon et al. |
| 2021/0067375 A1 | 3/2021 | Cidon et al. |
| 2021/0067407 A1 | 3/2021 | Cidon et al. |
| 2021/0067427 A1 | 3/2021 | Cidon et al. |
| 2021/0067442 A1 | 3/2021 | Sundararajan et al. |
| 2021/0067461 A1 | 3/2021 | Cidon et al. |
| 2021/0067464 A1 | 3/2021 | Cidon et al. |
| 2021/0067467 A1 | 3/2021 | Cidon et al. |
| 2021/0067468 A1 | 3/2021 | Cidon et al. |
| 2021/0105199 A1 | 4/2021 | C H et al. |
| 2021/0112034 A1 | 4/2021 | Sundararajan et al. |
| 2021/0126830 A1 | 4/2021 | R. et al. |
| 2021/0126853 A1 | 4/2021 | Ramaswamy et al. |
| 2021/0126854 A1 | 4/2021 | Guo et al. |
| 2021/0126860 A1 | 4/2021 | Ramaswamy et al. |
| 2021/0144091 A1 | 5/2021 | C H et al. |
| 2021/0160169 A1 | 5/2021 | Shen et al. |
| 2021/0160813 A1 | 5/2021 | Gupta et al. |
| 2021/0184952 A1 | 6/2021 | Mayya et al. |
| 2021/0184966 A1 | 6/2021 | Ramaswamy et al. |
| 2021/0184983 A1 | 6/2021 | Ramaswamy et al. |
| 2021/0194814 A1 | 6/2021 | Roux et al. |
| 2021/0226880 A1 | 7/2021 | Ramamoorthy et al. |
| 2021/0234728 A1 | 7/2021 | Cidon et al. |
| 2021/0234775 A1 | 7/2021 | Devadoss et al. |
| 2021/0234786 A1 | 7/2021 | Devadoss et al. |
| 2021/0234804 A1 | 7/2021 | Devadoss et al. |
| 2021/0234805 A1 | 7/2021 | Devadoss et al. |
| 2021/0235312 A1 | 7/2021 | Devadoss et al. |
| 2021/0235313 A1 | 7/2021 | Devadoss et al. |
| 2021/0266262 A1 | 8/2021 | Subramanian et al. |
| 2021/0279069 A1 | 9/2021 | Salgaonkar et al. |
| 2021/0314289 A1 | 10/2021 | Chandrashekhar et al. |
| 2021/0328835 A1 | 10/2021 | Mayya et al. |
| 2021/0336880 A1 | 10/2021 | Gupta et al. |
| 2021/0377109 A1 | 12/2021 | Shrivastava et al. |
| 2021/0377156 A1 | 12/2021 | Michael et al. |
| 2021/0392060 A1 | 12/2021 | Silva et al. |
| 2021/0392070 A1 | 12/2021 | Tootaghaj et al. |
| 2021/0399920 A1 | 12/2021 | Sundararajan et al. |
| 2021/0399978 A9 | 12/2021 | Michael et al. |
| 2021/0400113 A1 | 12/2021 | Markuze et al. |
| 2021/0409277 A1* | 12/2021 | Jeuk .................. H04L 41/14 |
| 2022/0006726 A1 | 1/2022 | Michael et al. |
| 2022/0006751 A1 | 1/2022 | Ramaswamy et al. |

(56) References Cited

U.S. PATENT DOCUMENTS

| | | |
|---|---|---|
| 2022/0006756 A1 | 1/2022 | Ramaswamy et al. |
| 2022/0035673 A1 | 2/2022 | Markuze et al. |
| 2022/0038370 A1 | 2/2022 | Vasseur et al. |
| 2022/0038557 A1 | 2/2022 | Markuze et al. |
| 2022/0094644 A1 | 3/2022 | Cidon et al. |

FOREIGN PATENT DOCUMENTS

| | | |
|---|---|---|
| CN | 102811165 A | 12/2012 |
| CN | 104956329 A | 9/2015 |
| CN | 106656847 A | 5/2017 |
| CN | 110447209 A | 11/2019 |
| CN | 111198764 A | 5/2020 |
| EP | 1912381 A1 | 4/2008 |
| EP | 3041178 A1 | 7/2016 |
| EP | 3509256 A1 | 7/2019 |
| JP | 2010233126 A | 10/2010 |
| JP | 2017059991 A | 3/2017 |
| RU | 2574350 C2 | 2/2016 |
| WO | 03073701 A1 | 9/2003 |
| WO | 2007016834 A1 | 2/2007 |
| WO | 2012167184 A2 | 12/2012 |
| WO | 2016061546 A1 | 4/2016 |
| WO | 2017083975 A1 | 5/2017 |
| WO | 2019070611 A1 | 4/2019 |
| WO | 2019094522 A1 | 5/2019 |
| WO | 2020012491 A1 | 1/2020 |
| WO | 2020018704 A1 | 1/2020 |
| WO | 2020091777 A1 | 5/2020 |
| WO | 2020101922 A1 | 5/2020 |
| WO | 2020112345 A1 | 6/2020 |
| WO | 2021040934 A1 | 3/2021 |
| WO | 2021118717 A1 | 6/2021 |
| WO | 2021150465 A1 | 7/2021 |
| WO | 2021211906 A1 | 10/2021 |
| WO | 2022005607 A1 | 1/2022 |

OTHER PUBLICATIONS

Alvizu, Rodolfo, et al., "SDN-Based Network Orchestration for New Dynamic Enterprise Networking Services," 2017 19th International Conference on Transparent Optical Networks, Jul. 2-6, 2017, 4 pages, IEEE, Girona, Spain.

Barozet, Jean-Marc, "Cisco SDWAN," Deep Dive, Dec. 2017, 185 pages, Cisco, Retreived from https://www.coursehero.com/file/71671376/Cisco-SDWAN-Deep-Divepdf/.

Bertaux, Lionel, et al., "Software Defined Networking and Virtualization for Broadband Satellite Networks," IEEE Communications Magazine, Mar. 18, 2015, 7 pages, vol. 53, IEEE, retrieved from https://ieeexplore.ieee.org/document/7060482.

Cox, Jacob H., et al., "Advancing Software-Defined Networks: A Survey," IEEE Access, Oct. 12, 2017, 40 pages, vol. 5, IEEE, retrieved from https://ieeexplore.ieee.org/document/8066287.

Del Piccolo, Valentin, et al., "A Survey of Network Isolation Solutions for Multi-Tenant Data Centers," IEEE Communications Society, Apr. 20, 2016, vol. 18, No. 4, 37 pages, IEEE.

Duan, Zhenhai, et al., "Service Overlay Networks: SLAs, QoS, and Bandwidth Provisioning," IEEE/ACM Transactions on Networking, Dec. 2003, 14 pages, vol. 11, IEEE, New York, NY, USA.

Fortz, Bernard, et al., "Internet Traffic Engineering by Optimizing OSPF Weights," Proceedings IEEE INFOCOM 2000, Conference on Computer Communications, Nineteenth Annual Joint Conference of the IEEE Computer and Communications Societies, Mar. 26-30, 2000, 11 pages, IEEE, Tel Aviv, Israel, Israel.

Francois, Frederic, et al., "Optimizing Secure SDN-enabled Inter-Data Centre Overlay Networks through Cognitive Routing," 2016 IEEE 24th International Symposium on Modeling, Analysis and Simulation of Computer and Telecommunication Systems (MASCOTS), Sep. 19-21, 2016, 10 pages, IEEE, London, UK.

Guo, Xiangyi, et al., (U.S. Appl. No. 62/925,193), filed Oct. 23, 2019, 26 pages.

Huang, Cancan, et al., "Modification of Q.SD-WAN," Rapporteur Group Meeting—Doc, Study Period 2017-2020, Q4/11-DOC1 (190410), Study Group 11, Apr. 10, 2019, 19 pages, International Telecommunication Union, Geneva, Switzerland.

Lasserre, Marc, et al., "Framework for Data Center (DC) Network Virtualization," RFC 7365, Oct. 2014, 26 pages, IETF.

Li, Shengru, et al., "Source Routing with Protocol-oblivious Forwarding (POF) to Enable Efficient e-Health Data Transfers," 2016 IEEE International Conference on Communications (ICC), May 22-27, 2016, 6 pages, IEEE, Kuala Lumpur, Malaysia.

Lin, Weidong, et al., "Using Path Label Routing in Wide Area Software-Defined Networks with Open Flow," 2016 International Conference on Networking and Network Applications, Jul. 2016, 6 pages, IEEE.

Long, Feng, "Research and Application of Cloud Storage Technology in University Information Service," Chinese Excellent Masters' Theses Full-text Database, Mar. 2013, 72 pages, China Academic Journals Electronic Publishing House, China.

Michael, Nithin, et al., "HALO: Hop-by-Hop Adaptive Link-State Optimal Routing," IEEE/ACM Transactions on Networking, Dec. 2015, 14 pages, vol. 23, No. 6, IEEE.

Ming, Gao, et al., "A Design of SD-WAN-Oriented Wide Area Network Access," 2020 International Conference on Computer Communication and Network Security (CCNS), Aug. 21-23, 2020, 4 pages, IEEE, Xi'an, China.

Mishra, Mayank, et al., "Managing Network Reservation for Tenants in Oversubscribed Clouds," 2013 IEEE 21st International Symposium on Modelling, Analysis and Simulation of Computer and Telecommunication Systems, Aug. 14-16, 2013, 10 pages, IEEE, San Francisco, CA, USA.

Mudigonda, Jayaram, et al., "NetLord: A Scalable Multi-Tenant Network Architecture for Virtualized Datacenters," Proceedings of the ACM SIGCOMM 2011 Conference, Aug. 15-19, 2011, 12 pages, ACM, Toronto, Canada.

Non-Published Commonly Owned Related International Patent Application PCT/US2022/011729 with similar specification, filed Jan. 7, 2022, 49 pages, VMware, Inc.

Non-Published Commonly Owned U.S. Appl. No. 17/103,614, filed Nov. 24, 2020, 38 pages, VMware, Inc.

Non-Published Commonly Owned U.S. Appl. No. 17/143,092, filed Jan. 6, 2021, 42 pages, VMware, Inc.

Non-Published Commonly Owned U.S. Appl. No. 17/143,094, filed Jan. 6, 2021, 42 pages, VMware, Inc.

Non-Published Commonly Owned U.S. Appl. No. 17/194,038, filed Mar. 5, 2021, 35 pages, VMware, Inc.

Non-Published Commonly Owned U.S. Appl. No. 17/227,016, filed Apr. 9, 2021, 37 pages, VMware, Inc.

Non-Published Commonly Owned U.S. Appl. No. 17/227,044, filed Apr. 9, 2021, 37 pages, VMware, Inc.

Non-Published Commonly Owned U.S. Appl. No. 17/351,327, filed Jun. 18, 2021, 48 pages, VMware, Inc.

Non-Published Commonly Owned U.S. Appl. No. 17/351,333, filed Jun. 18, 2021, 47 pages, VMware, Inc.

Non-Published Commonly Owned U.S. Appl. No. 17/351,340, filed Jun. 18, 2021, 48 pages, VMware, Inc.

Non-Published Commonly Owned U.S. Appl. No. 17/351,342, filed Jun. 18, 2021, 47 pages, VMware, Inc.

Non-Published Commonly Owned U.S. Appl. No. 17/351,345, filed Jun. 18, 2021, 48 pages, VMware, Inc.

Non-Published Commonly Owned U.S. Appl. No. 17/384,735, filed Jul. 24, 2021, 62 pages, VMware, Inc.

Non-Published Commonly Owned U.S. Appl. No. 17/384,736, filed Jul. 24, 2021, 63 pages, VMware, Inc.

Non-Published Commonly Owned U.S. Appl. No. 17/384,737, filed Jul. 24, 2021, 63 pages, VMware, Inc.

Non-Published Commonly Owned U.S. Appl. No. 17/384,738, filed Jul. 24, 2021, 62 pages, VMware, Inc.

Non-Published Commonly Owned U.S. Appl. No. 17/510,862, filed Oct. 26, 2021, 46 pages, VMware, Inc.

Non-Published Commonly Owned U.S. Appl. No. 17/517,639, filed Nov. 2, 2021, 46 pages, VMware, Inc.

Non-Published Commonly Owned U.S. Appl. No. 17/517,641, filed Nov. 2, 2021, 46 pages, VMware, Inc.

(56) References Cited

OTHER PUBLICATIONS

Non-Published Commonly Owned U.S. Appl. No. 17/562,890, filed Dec. 27, 2021, 36 pages, Nicira, Inc.
Non-Published Commonly Owned U.S. Appl. No. 17/568,795, filed Jan. 5, 2022, 34 pages, VMware, Inc.
Non-Published Commonly Owned Related U.S. Appl. No. 17/569,517 with similar specification, filed Jan. 6, 2022, 49 pages, VMware, Inc.
Non-Published Commonly Owned Related U.S. Appl. No. 17/569,519 with similar specification, filed Jan. 6, 2022, 48 pages, VMware, Inc.
Non-Published Commonly Owned Related U.S. Appl. No. 17/569,522 with similar specification, filed Jan. 6, 2022, 48 pages, VMware, Inc.
Non-Published Commonly Owned Related U.S. Appl. No. 17/569,523 with similar specification, filed Jan. 6, 2022, 48 pages, VMware, Inc.
Non-Published Commonly Owned Related U.S. Appl. No. 17/569,524 with similar specification, filed Jan. 6, 2022, 48 pages, VMware, Inc.
Non-Published Commonly Owned U.S. Appl. No. 17/569,526, filed Jan. 6, 2022, 27 pages, VMware, Inc.
Non-Published Commonly Owned U.S. Appl. No. 17/572,583, filed Jan. 10, 2022, 33 pages, Nicira, Inc.
Non-Published Commonly Owned U.S. Appl. No. 15/803,964, filed Nov. 6, 2017, 15 pages, The Mode Group.
Noormohammadpour, Mohammad, et al., "DCRoute: Speeding up Inter-Datacenter Traffic Allocation while Guaranteeing Deadlines," 2016 IEEE 23rd International Conference on High Performance Computing (HiPC), Dec. 19-22, 2016, 9 pages, IEEE, Hyderabad, India.
PCT International Search Report and Written Opinion of Commonly Owned International Patent Application PCT/US2022/011729, dated Apr. 4, 2022, 12 pages, International Searching Authority (EPO).
Ray, Saikat, et al., "Always Acyclic Distributed Path Computation," University of Pennsylvania Department of Electrical and Systems Engineering Technical Report, May 2008, 16 pages, University of Pennsylvania ScholarlyCommons.
Sarhan, Soliman Abd Elmonsef, et al., "Data Inspection in SDN Network," 2018 13th International Conference on Computer Engineering and Systems (ICCES), Dec. 18-19, 2018, 6 pages, IEEE, Cairo, Egypt.
Tootaghaj, Diman Zad, et al., "Homa: An Efficient Topology and Route Management Approach in SD-WAN Overlays," IEEE INFOCOM 2020—IEEE Conference on Computer Communications, Jul. 6-9, 2020, 10 pages, IEEE, Toronto, ON, Canada.
Webb, Kevin C., et al., "Blender: Upgrading Tenant-Based Data Center Networking," 2014 ACM/IEEE Symposium on Architectures for Networking and Communications Systems (ANCS), Oct. 20-21, 2014, 11 pages, IEEE, Marina del Rey, CA, USA.
Xie, Junfeng, et al., A Survey of Machine Learning Techniques Applied to Software Defined Networking (SDN): Research Issues and Challenges, IEEE Communications Surveys & Tutorials, Aug. 23, 2018, 38 pages, vol. 21, Issue 1, IEEE.
Yap, Kok-Kiong, et al., "Taking the Edge off with Espresso: Scale, Reliability and Programmability for Global Internet Peering," SIGCOMM '17: Proceedings of the Conference of the ACM Special Interest Group on Data Communication, Aug. 21-25, 2017, 14 pages, Los Angeles, CA.
Barozet, Jean-Marc, "Cisco SD-WAN as a Managed Service," BRKRST-2558, Jan. 27-31, 2020, 98 pages, Cisco, Barcelona, Spain, retrieved from https://www.ciscolive.com/c/dam/r/ciscolive/emea/docs/2020/pdf/BRKRST-2558.pdf.

* cited by examiner

METHOD AND APPARATUS TO EVALUATE RESOURCE ELEMENTS AND PUBLIC CLOUDS FOR DEPLOYING TENANT DEPLOYABLE ELEMENTS BASED ON HARVESTED PERFORMANCE METRICS

BACKGROUND

Today, scaling and serving high influxes of traffic and requests is necessary in a rapidly growing world of Internet network infrastructure. Traffic patterns can vary depending on various factors such as application, time of day, region, etc., which has led to a transition to virtualization from traditional hardware appliances in order to cater to the varying traffic patterns. As public datacenters offered by multiple cloud service providers (CSPs) become more popular and widespread, virtual network functions (VNFs), and/or other types of tenant deployable elements, that were previously deployed on private datacenters are now being migrated to the CSPs, which offer various resource element types (e.g., resource elements that offer different compute, network, and storage options).

However, the performance metrics published by these CSPs are often simplistic and fall short of providing necessary information that is crucial to deployment and elasticity of the VNFs. As a result, several challenges arise including determining the appropriate resource element type to meet the performance needs of various VNFs, dimensioning the deployment (e.g., determining the number of instances of the resource element type needed and determining an availability set for fault tolerance), determining whether the published SLAs (service-level agreements) are adhered to, determining the scale-in/-out triggers for different resource element types, etc.

BRIEF SUMMARY

Some embodiments of the invention provide a method for evaluating multiple candidate resource elements that are candidates for deploying a set of one or more tenant deployable elements in a public cloud. For each particular tenant deployable element, the method deploys in the public cloud at least one instance of each of a set of one or more candidate resource elements and at least one agent to execute on the deployed resource element instance. The method communicates with each deployed agent to collect metrics for quantifying performance of the agent's respective resource element instance. The method then aggregates the collected metrics in order to generate a report that quantifies performance of each candidate resource element in the set of candidate resource elements for deploying the particular tenant deployable element in the public cloud.

In some embodiments, the generated reports are used for each particular tenant deployable element to select a candidate resource element to use to deploy the particular tenant deployable element in the public cloud. Also, in some embodiments, first and second types of candidate resource elements are candidates for one particular tenant deployable element, and by quantifying the performance of the first and second candidate resource elements, the report specifies either the first or second candidate resource element as a better resource element for deploying the particular tenant deployable element than the other candidate resource element. In addition to selecting which candidate resource element to deploy, some embodiments also use the generated report to determine a number of instances of the candidate resource element to deploy for the particular tenant deployable element in the public cloud. In some embodiments, to deploy the candidate resource element instance(s), a resource element instance is selected from a pool of pre-allocated resource elements in the public cloud, while in other embodiments, one or more new instances of the resource element are spun up for deployment.

The candidate resource elements, in some embodiments, also include different sub-types of candidate resource elements. In some embodiments, these different sub-types perform a same set of operations for the tenant deployable resource, but consume different amounts of resources on host computers, such as processor resources, memory resources, storage resources, and ingress/egress bandwidth. For example, in some embodiments, the tenant deployable element is a workload or service machine for execution on a host computer, and the different sub-types of candidate resource elements perform a set of operations of the workload or service machine, but consume different amounts of memory. The selected candidate resource element, in some embodiments, is selected based on whether these amounts meet a guaranteed SLA, or whether the number of instances of the selected candidate resource elements it takes to meet the SLA based on these amounts is fewer than the number of instances of other candidate resource elements it takes to meet the SLA. Alternatively, or conjunctively, different resource elements of the same resource element type, in some embodiments, perform different sets of operations.

The collected metrics, in some embodiments, include metrics such as throughput (e.g., in bits per second, in bytes per second, etc.), packets per second, connections per second, requests per second, transactions per second, transmission controller protocol (TCP) SYN arrival rate, number of open TCP connections, number of established TCP connections, and number of secure socket layer (SSL) transactions. In some embodiments, the metrics are collected based on a set of variables (e.g., variables specified in a request) such as cloud service provider (CSP) (e.g., Amazon AWS, Microsoft Azure, etc.), region, availability zone, resource element type, time of day, payload size, payload type, and encryption and authentication types. For example, the metrics in some embodiments may be collected for a particular resource element type in a public cloud provided by a particular CSP in a particular region during a particular time of day (e.g., during peak business hours for the particular region).

In some embodiments, the resource element types include compute resource elements (e.g., virtual machines (VMs), containers, middlebox service, nodes, and pods), networking resource elements (e.g., switches, routers, firewalls, load balancers, and network address translators (NATs)), and storage resource elements (e.g., databases, datastores, etc.). Examples of tenant deployable elements, in some embodiments, include load balancers, firewalls, intrusion detection systems, deep packet inspectors (DPIs), and network address translators (NATs).

In some embodiments, a controller or controller cluster directs each deployed agent to perform a set of performance-related tests on the agent's respective resource element instance to collect metrics associated with the agent's respective resource element instance. The controller cluster, in some embodiments, also configures each deployed agent to provide the collected metrics to the controller cluster, which aggregates the collected metrics to generate the report. In some embodiments, the controller cluster configures the agents to provide the collected metrics to the controller cluster by recording the metrics in a database accessible to the controller cluster so that the controller cluster can retrieve the metrics from the database for aggregation. In some such embodiments, the controller cluster stores the generated report in the database, and retrieves the generated report (and other reports) from the database in order to respond to requests for metrics, and requests to identify and deploy additional resource element instances in the public cloud and in other public clouds, according to some embodiments.

Also, in some embodiments, the controller cluster monitors the deployed resource elements and modifies these deployed resource elements based on evaluations of both real-time (i.e., current) and historical metrics. In some embodiments, the controller cluster modifies the deployed resource elements by scaling-up or scaling-down the number of instances of the deployed resource element. For example, the controller cluster scales-up or scales-down the number of instances periodically, in some embodiments, to ensure a guaranteed SLA is met during normal hours and during peak hours (i.e., by scaling-up the number of instances during peak hours, and scaling back down the number of instances during normal hours).

The controller cluster, in some embodiments, operates in the same public cloud as the agents, while in other embodiments, the controller cluster operates in another cloud (public or private). When the controller cluster operates in another cloud, in some embodiments, at least one agent is deployed in the other cloud and communicates with each other agent deployed in the public cloud to perform at least one performance-related test for which both agents (i.e., the agent in the public cloud and the agent in the other cloud) collect metric data.

In some embodiments, the deployed agents and the controller cluster implement a framework for evaluating a set of one or more public clouds and one or more resource elements in the set of public clouds as candidates for deploying tenant deployable elements. The requests, in some embodiments, are received from users through a user interface provided by the controller cluster. Alternatively, or conjunctively, the requests in some embodiments are received from network elements through a representational state transfer (REST) endpoint provided by the controller cluster.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for evaluating multiple candidate resource elements that are candidates for deploying a set of one or more tenant deployable elements in a public cloud. For each particular tenant deployable element, the method deploys in the public cloud at least one instance of each of a set of one or more candidate resource elements and at least one agent to execute on the deployed resource element instance. The method communicates with each deployed agent to collect metrics for quantifying performance of the agent's respective resource element instance. The method then aggregates the collected metrics in order to generate a report that quantifies performance of each candidate resource element in the set of candidate resource elements for deploying the particular tenant deployable element in the public cloud.

Figure 1:
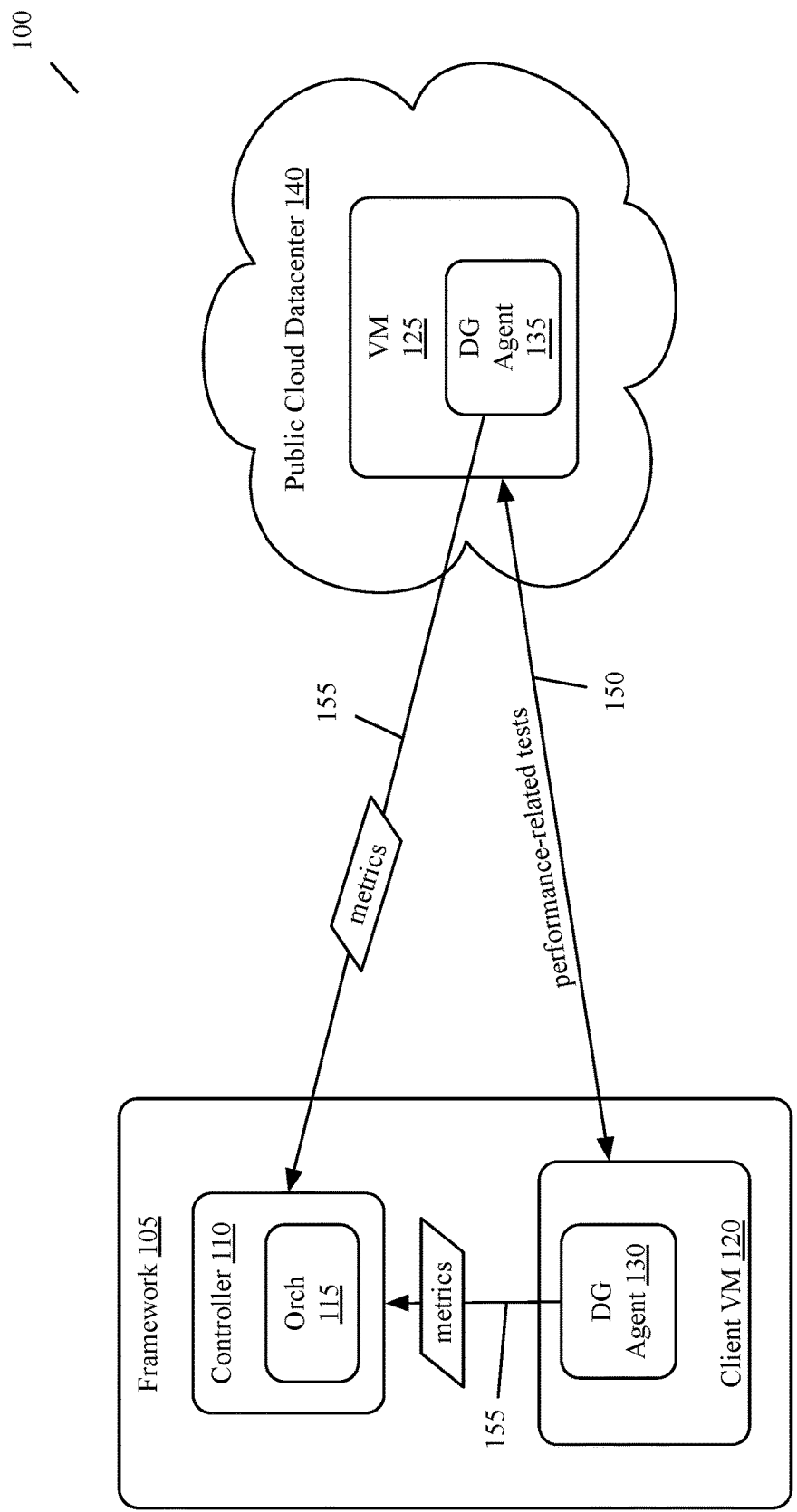
FIG. 1 conceptually illustrates a data gathering framework deployed in a virtual network in some embodiments.

FIG. 1 illustrates a data gathering framework deployed in a virtual network in some embodiments to collect metrics across multiple public CSPs, regions, resource element types, times of day, payload types, and payload sizes, which are used to obtain real-time and historical performance metrics. In some embodiments, the framework can be realized as a software as a service (SaaS) application that offers services where information can be made available via a user interface (UI), REST APIs, and reports, while in other embodiments, the framework can be realized as an independent standalone companion application that can be deployed both alongside and bundled within a tenant deployable element, such as a virtual network function (VNF) or a cloud-native network function. Examples of tenant deployable elements in some embodiments include deep packet inspectors (DPIs), firewalls, load balancers, intrusion detection systems (IDSs), network address translators (NATs), etc.

As illustrated, the virtual network 100 includes a controller 110 (or controller cluster) and a client resource 120 within the framework 105, and a virtual machine (VM) 125 within the public datacenter 140. The client resource 120 can be a client-controlled VM operating in the framework 105. While the controller and the client resource 120 are visually represented together within the framework 105, the controller and client resource in some embodiments are located at different sites. For example, the controller 110 in some embodiments may be located at a first private datacenter, while the client resource 120 is located at a second private datacenter.

The virtual network 100 in some embodiments is established for a particular entity. An example of an entity for which such a virtual network can be established includes a business entity (e.g., a corporation), a non-profit entity (e.g., a hospital, a research organization, etc.), and an education entity (e.g., a university, a college, etc.), or any other type of entity. Examples of public cloud providers include Amazon Web Services (AWS), Google Cloud Platform (GCP), Microsoft Azure, etc., while examples of entities include a company (e.g., corporation, partnership, etc.), an organization (e.g., a school, a non-profit, a government entity, etc.), etc. In some embodiments, the virtual network 100 is a Software-Defined Wide Area Network (SDWAN) that span multiple different public cloud datacenters in different geographic locations.

The client resource 120 and the VM 125 in some embodiments can be resource elements of any resource element type and include various combinations of CPU (central processing unit), memory, storage, and networking capacity. While the client resource elements 120 and the VM 125 are illustrated and described herein as instances of VMs, in other embodiments, these resource can be containers, pods, compute nodes, and other types of VMs (e.g., service VMs). As shown, the client resource 120 include a data gathering ("DG") agent 130 and the VM 125 includes a DG agent 135 (a DG agents is also referred to herein as an "agent").

Additionally, the controller 110 includes an orchestration component 115. In some embodiments, the client resource 120, the VM 125, and the agents 130 and 135 are deployed by the orchestration component 115 of the controller 110 for the purpose of performing performance-related tests and collecting performance metrics (e.g., key performance indicators (KPIs)) during those tests. Also, in some embodiments, the orchestration component may deploy additional resource elements of a same resource element type, or different resource element type(s), in the public cloud datacenter 140, as well as in other public cloud datacenters (not shown), as will be further described below.

In some embodiments, the agents 130 and 135 perform individual tests at their respective sites, and perform tests between the sites along the connection links 150. Different performance-related tests can be used to measure different metrics, in some embodiments. Examples of different metrics that can be measured using the performance-related tests include throughput (e.g., in bits per second, bytes per second, etc.), packets per second, connections per second, requests per second, transactions per second, TCP SYN arrival rate, number of open TCP connections, number of established TCP connections, and secure sockets layer (SSL) transactions. In some embodiments, performance metrics other than those indicated herein may also be collected. Also, in some embodiments, different metric types can be collected for different types of resource elements. For instance, the metrics collected for a load balancer may be different by one or more metric types than the metrics collected for a DPI.

As the agents 130 and 135 perform the tests and collect metrics, they send the collected metrics to the controller 110 for aggregation and analysis, in some embodiments. In the network 100, the agents 130 and 135 are illustrated with links 155 leading back to the controller 110 along which the metrics are sent. While illustrated as individual connection links, the links 150 and 155 are sets of multiple connection links, with paths across these multiple connection links, in some embodiments.

Figure 2:
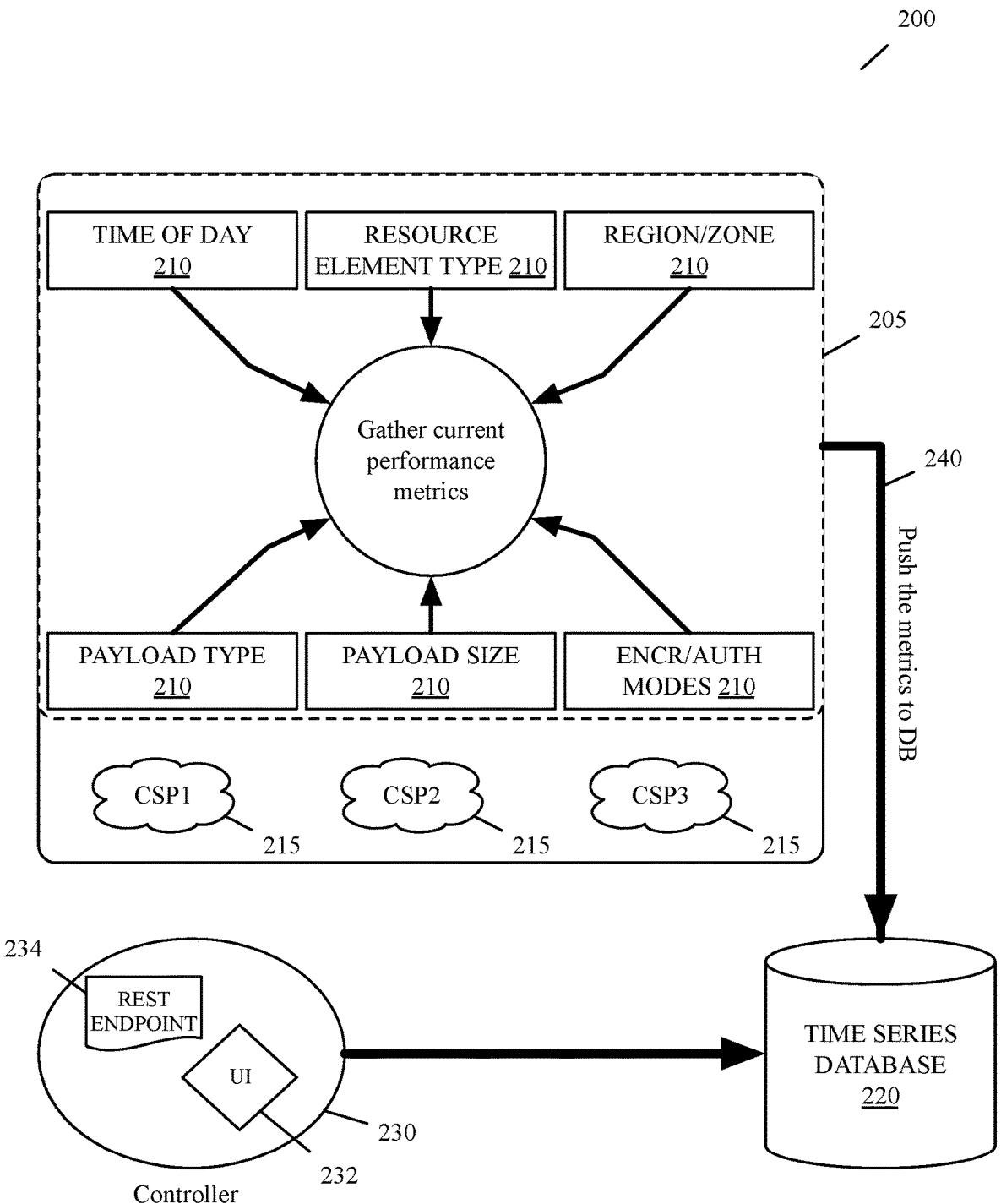
FIG. 2 illustrates a simplified diagram showing a performance traffic stream, in some embodiments.

In some embodiments, rather than sending the metrics directly to the controller, the agents push the collected metrics to a time-series database where the metrics are recorded and accessed by the controller for aggregation and publication. FIG. 2 illustrates a simplified diagram showing such a performance traffic stream, in some embodiments. The traffic stream 200 includes a public cloud datacenter 205 in which performance metrics 210 are gathered from a set of CSPs 215, a time-series database 220, and a controller 230 that includes a user interface (UI) 232 and a REST endpoint 234.

As illustrated, the collected metrics include time of day, resource element type, region/zone, payload type, payload size, and encryption/authentication modes. In some embodiments, the collected metrics can include additional or fewer metrics than those shown, as well as different metrics than those shown. As the metrics are gathered in the public cloud datacenter 205, they are pushed to the time-series database 220 along the path 240, and recorded in the database.

Once the collected metrics have been recorded in the time-series database 220, the controller 230 can access the collected metrics to aggregate them, and record the aggregated metrics in the database. In some embodiments, the REST endpoint 234 of the controller 230 provides a front end for publishing information, and serves published REST APIs. Additionally, the UI 232 provides a way for users to query information and receive query results, as well as to subscribe and receive standard and/or custom alerts, according to some embodiments. In some embodiments, the information from the database is used for capacity planning, dimensioning, and defining scale-in/scale-out, especially during peak hours in order to efficiently manage both the load and resource elements.

In some embodiments, the queries can be directed toward specific metrics (e.g., time of day, resource element type, region/zone, payload type, payload size, and encryption/authentication modes). For example, a query might seek to determine the packets per second from a first resource element type belonging to a first CSP in a first region to a second resource element type of a second CSP in a second region during a specified time period (e.g., 8:00 AM to 11:00 AM). Additional query examples can include a query to determine the average connections per second for a particular resource element type during a specific month of the year, and a query to determine variance in throughput on a specific day of the week for a resource element instance that claims a particular speed.

Figure 3:
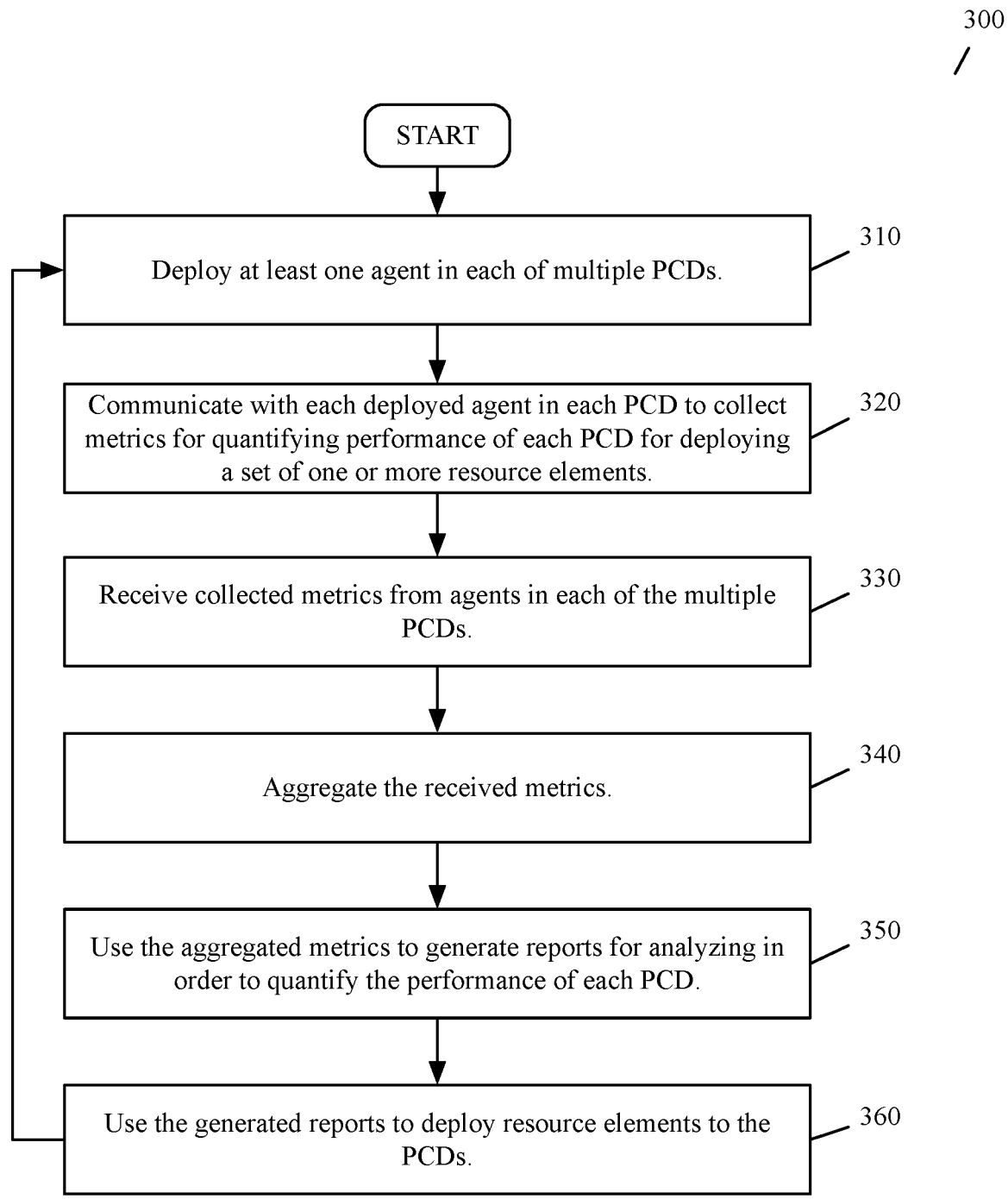
FIG. 3 illustrates a process performed by the controller and orchestrator, in some embodiments, to collect performance metrics.

FIG. 3 illustrates a process 300 for evaluating multiple public cloud datacenters that are candidate datacenters for deploying resource elements, in some embodiments. In some embodiments, the process 300 is performed by the controller 110 to identify a public cloud for deploying one or more resource elements based on performance metrics associated with each candidate public cloud and collected by DG agents deployed in each candidate public cloud. The candidate public clouds in some embodiments include public clouds that are provided by different CSPs.

The process 300 starts (at 310) by deploying at least one agent in each of multiple public cloud datacenters (PCDs). The controller in some embodiments deploys the agents in each PCD to execute on resource elements in each PCD. In some embodiments, the controller executes in a particular cloud datacenter, and deploys at least one agent to execute within that same particular cloud datacenter. The controller, agents, and resource elements on which the agents are deployed make up a data gathering and measurement framework.

The process communicates (at 320) with each deployed agent in each PCD to collect metrics for quantifying performance of each PCD for deploying a set of one or more resource elements. For example, the controller 110 in some embodiments communicates with the deployed agents in each PCD in order to direct the deployed agents to perform one or more performance-related tests and to collect metrics associated with the performance-related tests. In some embodiments, the controller also directs the at least one agent deployed within the same particular cloud datacenter as the controller to communicate with each other agent deployed in each other PCD to perform one or more performance-related tests to quantify performance of each PCD.

The process receives (at 330) collected metrics from the agents in each of the multiple PCDs. For example, in addition to performing performance-related tests and collecting metrics to quantify the performance of the PCDs and/or resource elements in the PCDs, each agent in some embodiments is configured to provide the collected metrics to the controller. As described above with reference to the traffic stream 200, the agents in some embodiments provide the collected metrics to the controller by recording the metrics in a time-series database for retrieval by the controller.

The process then aggregates (at 340) the collected metrics received from the deployed agents. The collected metrics, in some embodiments, are associated with the PCDs as well as resource elements deployed in the PCDs. For example, in some embodiments, the agents are deployed on different resource elements in the different PCDs, and collect metrics to quantify the performance of the different resource elements in the different PCDs, in addition to collecting metrics to quantify the performance of the different PCDs. In some embodiments, each deployed agent communicates with at least one other agent within the agent's respective PCD, and at least one other agent external to the agent's respective PCD, in order to collect metrics both inside and outside of the agent's respective PCD. The controller in some embodiments aggregates the collected metrics based on PCD association and/or resource element type association.

The process uses (at 350) the aggregated metrics in order to generate reports for analyzing in order to quantify the performance of each PCD. In some embodiments, the controller 230 stores the generated reports in the time-series database 220. The controller retrieves the generated reports from the time-series database in some embodiments for use in responding to queries for metrics associated with PCDs, resource elements, and/or a combination of PCDs and resource elements. The queries, in some embodiments, are received from users through the UI 232, or from network elements (e.g., other tenant deployable elements) through the REST endpoint 234.

The process then uses (at 360) the generated reports to deploy resource elements to the PCDs. In some embodiments, the process uses the generated reports to deploy resource elements to the PCDs according to requests to identify and deploy resource elements. Like the queries for metrics, the requests to identify and deploy resource elements to the PCDs can be received by the controller from users through a UI or from tenant deployable elements through a REST endpoint. Following 360, the process returns to 310 to continue deploying agents in different PCDs to continue collecting metrics.

Figure 4:
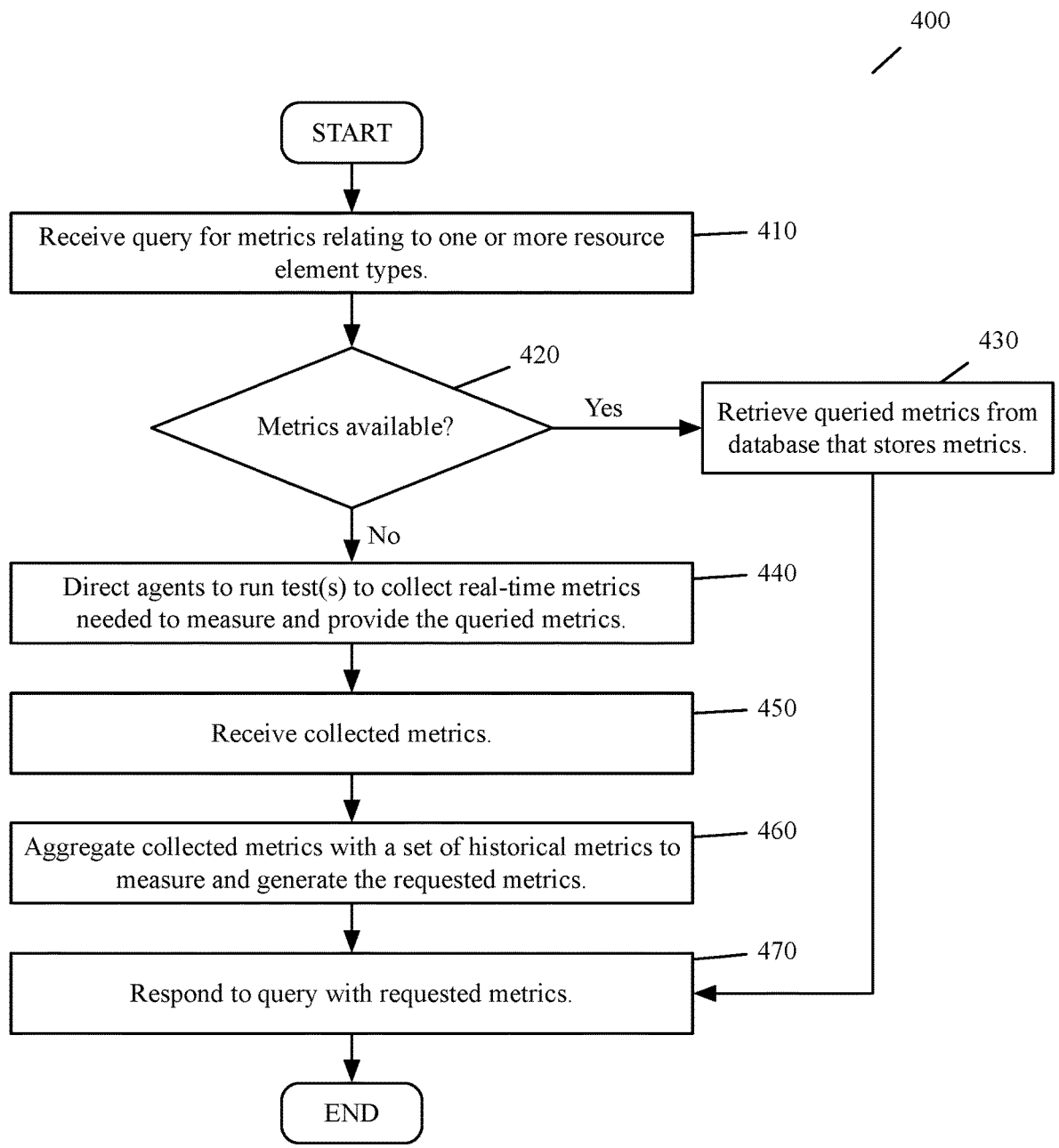
FIG. 4 illustrates a process performed by the controller in some embodiments to respond to a query for performance information.

FIG. 4 illustrates a process performed by the controller in some embodiments to respond to a query for performance information. The process 400 starts at 410 when the controller receives a query for information relating to one or more resource element types. In some embodiments, the controller receives queries through either a REST endpoint or a UI, as illustrated in FIG. 2. The controller then determines, at 420, whether the queried information is available. For example, the controller in some embodiments checks the time-series database to determine if metrics for a particular resource element type referenced in the query are available.

When the controller determines at 420 that the information being queried is available, the process transitions to 430 to retrieve the queried information. The process then proceeds to 470. Otherwise, when the controller determines that the queried information is not available, the process transitions to 440 to direct agents to run tests to collect real-time metrics (i.e., current metrics) needed to measure and provide the queried information.

Next, the controller receives, at 450, the collected metrics. For example, the controller in some embodiments can retrieve the metrics from the database after the agents have pushed said metrics to the database. The controller then aggregates, at 460, the collected metrics with a set of historical metrics (e.g., also retrieved from the database) to measure and generate the requested information. For instance, the controller may aggregate the collected metrics with historical metrics associated with the same or similar resource element types.

After generating the requested information, the controller responds to the query at 470 with the requested information. When the source of the query is a tenant deployable element (e.g., a VNF or cloud-native network function), for example, the controller can respond via the REST endpoint. Alternatively, when the source of the query is a user, the controller can respond via the UI, according to some embodiments. The process 400 then ends.

Figure 5:
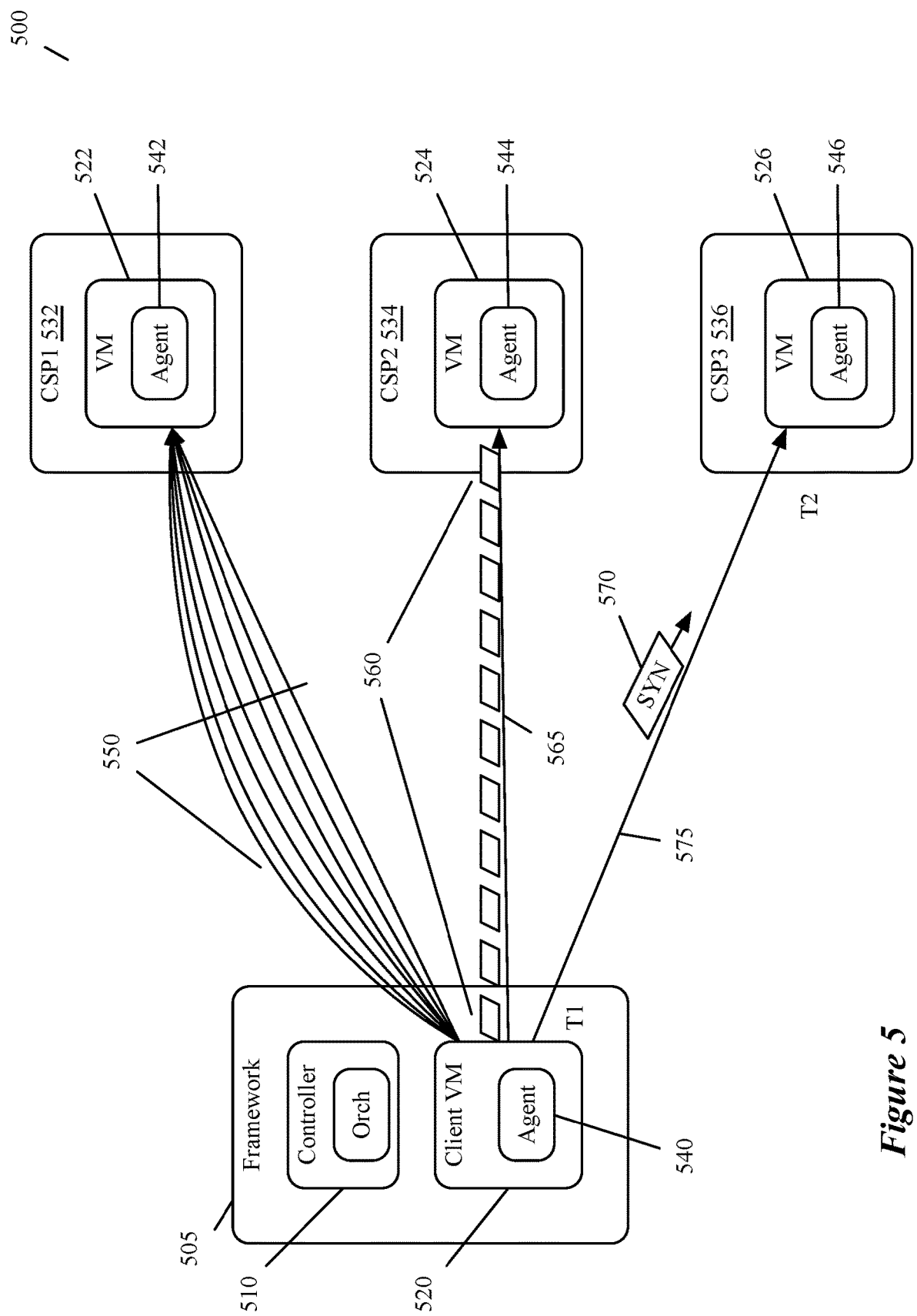
FIG. 5 illustrates a virtual network in which the data gathering framework is deployed during a set of performance-related tests, in some embodiments.

FIG. 5 illustrates a virtual network 500 in which the data gathering and measurement framework is deployed during a set of performance-related tests, in some embodiments. The virtual network 500 includes a controller (or controller cluster) 510 and a client resource element 520 within the framework 505, and VMs 522, 524, and 526 in public clouds 532, 534, and 536, respectively. Additionally, data gathering agents 540, 542, 544, and 546 are deployed on the client resource element 520, the VM 542, the VM 544, and the VM 546, respectively.

The figure illustrates three different performance-related tests being performed by the framework 505. In a first test, the client resource element 520 has several connections 550 to the VM 522, and the framework determines the number of connections that the VM can handle per second. In performing this test, the client resource element 520 continues to send connection requests to the VM 522, in some embodiments, until the VM becomes overloaded. In some embodiments, this test is performed multiple times according to multiple different sets of parameters, and, as a result, can be used to calculate, e.g., the average number of connections per second a particular VM can handle (e.g., a threshold number of connections per second). As will be discussed further below, different types of resource elements can include different sub-types of the resource elements which consume different amounts of resources (e.g., host computer resources), in some embodiments. In some such embodiments, the different sub-types may be associated with different metrics.

In a second test between the client resource element 520 and the VM 524, multiple packets 560 are sent along the connection link 565. The framework in turn determines the number of packets per second that the link 565 or the VM 524 can handle. The client resource element 520 can continue to send multiple packets to the VM 524 until the VM becomes overloaded (e.g., when packets begin to drop). Like the first test, the framework can perform this second test according to different sets of parameters (e.g., for different resource element types, different regions, different time periods, etc.).

In a third test between the client resource element 520 and the VM 526, the client resource element is illustrated as sending a SYN message 570 to the VM 526 along the connection link 575. Timestamps T1 and T2 are shown on either end of the connection link 575 to represent the sent and received times of the SYN message, and are used to determine the SYN arrival rate.

As the agents 540-546 collect the metrics from these tests, the agents push the collected metrics to the controller (i.e., to the database) for aggregation. In some embodiments, each of the tests illustrated is performed for each of the VMs. Also, in some embodiments, the tests can be performed between the different VMs of the various CSPs to measure performance between CSPs.

In some embodiments, the controller 110 manages resource elements deployed in public cloud datacenters based on real-time and historical performance metrics associated with the resource elements. In some embodiments, the controller monitors a particular resource element deployed in a particular public cloud datacenter (PCD). The controller identifies a set of performance metric values that correspond to a specified subset of performance metric types that are associated with the particular resource element and the particular PCD (e.g., CPU usage by a VM running in the PCD). The controller evaluates the identified set of performance metric values based on a set of guaranteed performance metric values, and modifies the particular resource element based on the evaluation (e.g., by deploying additional resource element instances of the particular resource element.)

Figure 6:
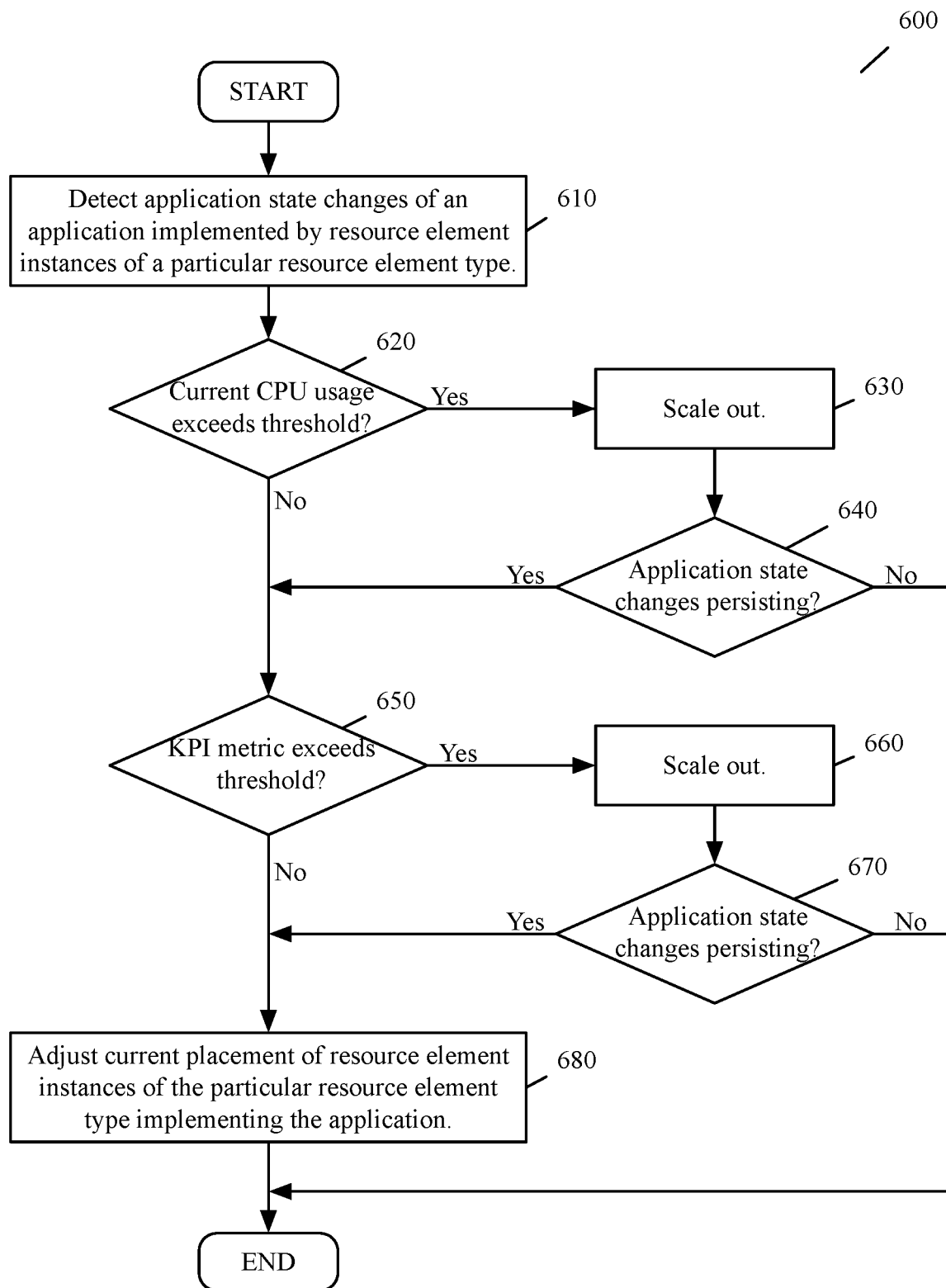
FIG. 6 illustrates a process performed in some embodiments to improve network performance based on real-time and historical performance metrics.

FIG. 6 illustrates a process performed in some embodiments to improve the performance of a virtual network based on real-time and historical performance metrics. The process 600 starts, at 610 by detecting application state changes. In some embodiments, the detected state changes are due to an application experiencing an unexpected period of downtime (e.g., due to network outages, server failures, etc.). After detecting the state changes, the process determines, at 610, whether the current CPU usage by the resource element (e.g., VM, container, etc.) executing the application exceeds a threshold.

The current CPU usage in some embodiments is the current CPU usage by the resource element as reported in a cloud environment. In some embodiments, the detected application state changes are a result of CPU usage by the resource element exceeding a threshold. To make this determination, some embodiments compare current (i.e., real-time) CPU usage of the resource element with historical or baseline CPU usage for the resource element to identify anomalies/discrepancies in the current CPU usage.

When the process determines at 620 that the CPU usage of the resource element does not exceed the threshold, the process transitions to 650 to determine whether one or more characteristic metrics associated with the resource element exceed a threshold. Otherwise, when the process determines at 620 that the CPU usage of the resource element does exceed the threshold, the process transitions to 630 to scale-out the number of instances of the resource element deployed in the cloud environment (i.e., to help distribute the load). In some embodiments, the process scales-out the number of instances by spinning up additional instances of the resource element to deploy. Alternatively, or conjunctively, some embodiments select additional resource element instances from a pre-allocated pool of resource element instances. The process then transitions to 640 to determine whether the application state changes are persisting.

When the process determines at 640 that the application state changes are no longer persisting (i.e., scaling out the number of instances of the resource element has resolved the issue), the process ends. Otherwise, when the process determines at 640 that the application state changes are still persisting, the process transitions to 650 to determine whether one or more characteristic metrics of the resource element (e.g., time of day, resource element type, region/zone, payload type, payload size, and encryption/authentication modes) exceed a threshold. In some embodiments, the detected state change is due to exceeding a threshold associated with one or more key performance metrics specific to the traffic pattern being served by a particular instance of a resource element. For example, the controller in some embodiments can determine that a guaranteed SLA is not being met by a particular resource element type, and in turn, provide additional instances of that type of resource element in order to meet the guaranteed SLA.

When the process determines at 650 that no characteristic metrics exceed the threshold, the process transitions to 680 to adjust the resource element instance's current placement. Otherwise, when the process determines at 650 that one or more characteristic metrics have exceeded the threshold, the process transitions to 660 to scale-out the number of resource element instances. The process then determines, at 670, whether the application state changes are still persisting (i.e., despite the additional resource element instances).

When the process determines at 670 that the state changes are no longer persisting, the process ends.

Alternatively, when the process determines at 670 that the state changes are persisting, the process transitions to 680 to adjust the current placement of the resource element instance(s). Some embodiments, for example, change a resource element instance's association from one host to another host (e.g., to mitigate connection issues experienced by the former host). Alternatively, or conjunctively, some embodiments adjust the placement of the resource element instance from one public cloud datacenter to another public cloud datacenter. As another alternative, some embodiments upgrade the resource element instance to a larger resource element instance on the same public cloud datacenter. After the resource element instance's current placement is adjusted at 680, the process ends.

In addition to responding to queries for different metrics and reports, the data gathering framework of some embodiments also receives and responds to queries directed to identifying resource element types for implementing tenant deployable elements and identifying public cloud datacenters in which instances of the identified resource element types should be deployed. For example, a query in some embodiments can include a request to identify a resource element type from a set of resource element types for deployment in one of two or more public cloud datacenters of two or more different CSPs. In some embodiments, the request specifies a set of criteria for identifying the resource element type and selecting the public cloud datacenter (e.g., the resource element type must be able to handle N number of connection requests per second).

Figure 7:
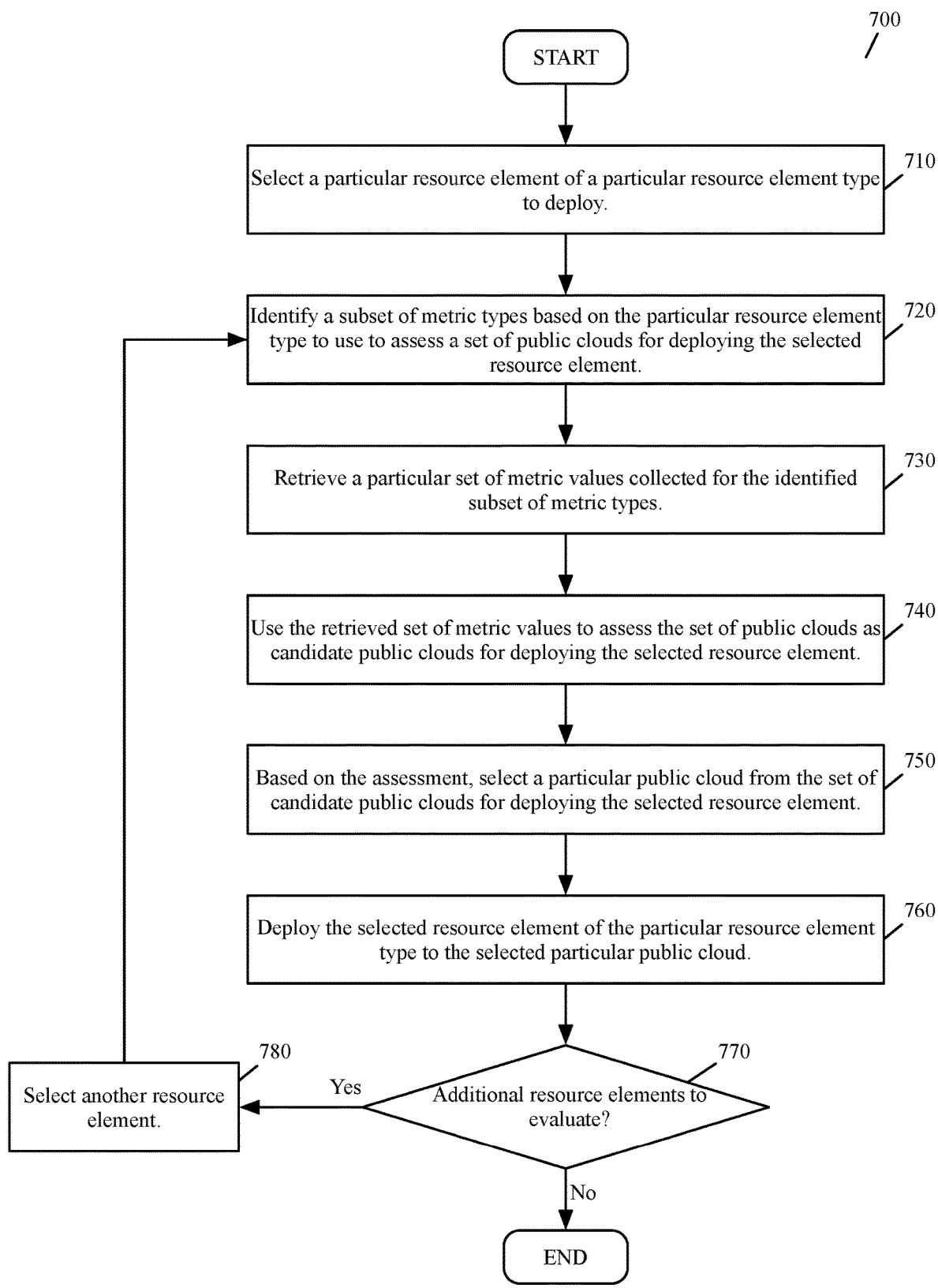
FIG. 7 illustrates a process performed in some embodiments in response to a request to identify and deploy a resource in a public cloud for implementing a tenant deployable element.

FIG. 7 illustrates a process 700 for deploying resource elements to a set of public clouds. In some embodiments, the process 700 is performed by the controller 110 to select a public cloud for deploying a selected resource element. The set of public clouds may include public clouds that are provided by different CSPs, in some embodiments.

The process 700 starts when the controller receives a request to deploy a resource element. The process selects (at 710) a particular resource element of a particular resource element type to deploy. In some embodiments, the process identifies the particular resource element of the particular resource element type to deploy by identifying a resource element type for implementing a particular tenant deployable element. Such a tenant deployable element in some embodiments may be a load balancer, a firewall, an intrusion detection system (IDS), a deep packet inspector (DPI), and network address translator (NAT).

The process identifies (at 720) a subset of metric types based on the particular resource element type to use to assess a set of public clouds for deploying the first resource element. In some embodiments, the subset of metric types is specified in the request to deploy the particular resource element, while in other embodiments, the process identifies from available or possible metric types a subset of metric types that are relevant to the particular resource element type as the subset of metric types.

The process retrieves (at 730) a particular set of metric values collected for the identified subset of metric types. In some embodiments, the metric values are retrieved by having one or more agents (e.g., the agents 540-546) perform the process 300 to collect the metrics or metric values associated with the particular resource element type. Alternatively, some embodiments retrieve the metric values from a database. The metric values collected by the agents, in some embodiments, include throughput (e.g., in bits per second, in bytes per second, etc.), packets per second, connections per second, requests per second, transactions per second, transmission control protocol (TCP) SYN arrival rate, number of open TCP connections, and number of established TCP connections.

The process uses the retrieved metric values to assess (at 740) the set of public clouds as candidate public clouds for deploying the selected resource element. In some embodiments, each candidate public cloud is assessed based on its own set of metric values for the identified subset of metric types for the particular resource element type (i.e., metric values collected for both the particular resource element type and the candidate public cloud). For example, in the virtual network 500 described above, the metrics collected by the agents 542-546 can include metrics associated with each VM 522-526 and their respective public clouds 532-536, in some embodiments.

Based on the assessment, the process selects (at 750) a particular public cloud from the set of public clouds for deploying the selected resource element. In some embodiments, the candidate public cloud having the best set of metric values for the identified subset of metric types for the selected resource element type compared to other candidate public clouds is selected. Alternatively, or conjunctively, the controller cluster in some embodiments provides the metrics to a user (e.g., network administrator) through a UI in the form of a report, and receives a selection through the UI from the user. In some embodiments, the selection includes an identifier for the selected public cloud.

The process deploys (at 760) the selected resource element of the particular resource element type to the selected particular public cloud. In some embodiments, the deployed particular resource element is a resource element instance selected from a pool of pre-allocated resource element instances of the particular resource element type in the selected public cloud. Alternatively, or conjunctively, some embodiments spin up new instances of the resource element for deployment.

The process then determines (at 770) whether there are any additional resource elements to evaluate for deployment. When the process determines that there are additional resource elements to evaluate, the process transitions to 780 to select another resource element. In some embodiments, the additional resource element selected for evaluation is a second resource element of a second resource element type. After selecting the second resource element, the process returns to 720 to identify a subset of metric types based on the second resource element. The subset of metric types identified for the second resource element may differ from the subset of metric types identified for the other resource element of the other type by at least one metric type, according to some embodiments. Additionally, in some embodiments, the second resource element performs different functions than the other resource element, while in other embodiments, the resource elements perform the same functions. In some embodiments, a second particular public cloud that is provided by a different CSP than the particular public cloud selected for the other resource element is then selected from the set of public clouds for deploying the second resource element of the second resource element type.

Returning to process 700, when the process instead determines (at 770) that there are no additional resource elements to evaluate, the process 700 ends. The data gathering and measurement framework described herein has many use cases, several of which are described above. To elaborate further on these novel use cases, and provide other novel use cases, additional novel processes for using the data gathering and measurement framework to intelligently deploy resources, and scale these resources, in a public cloud will be described below.

Figure 8:
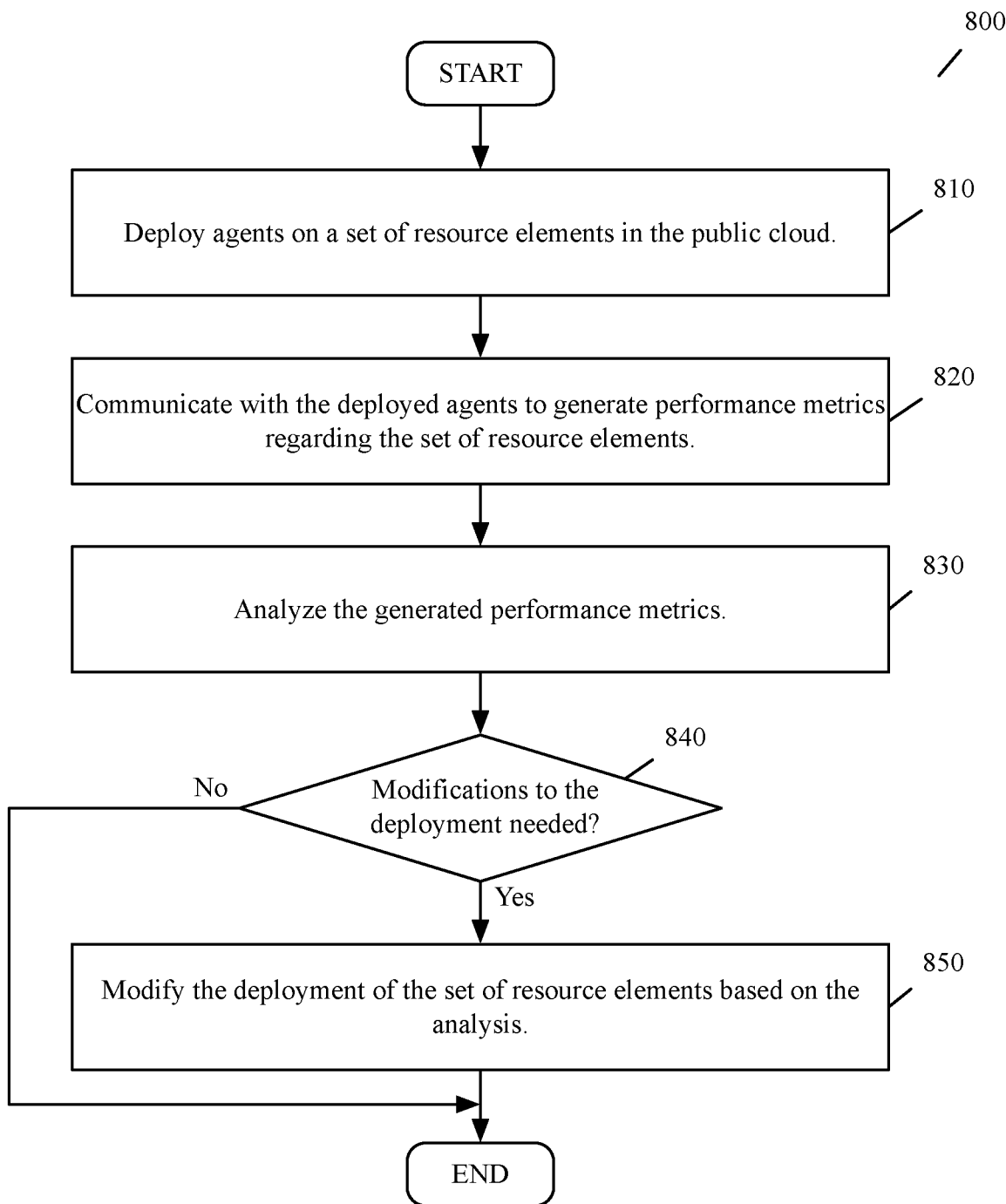
FIG. 8 illustrates a process of some embodiments for modifying a resource element deployed in a public cloud datacenter based on a subset of performance metrics associated with the resource element and the public cloud datacenter.

FIG. 8 illustrates a process of some embodiments for modifying resource elements deployed in a public cloud based on a subset of performance metrics associated with the resource elements and the public cloud. In some embodiments, the process 800 is performed by a controller or controller cluster (e.g., the controller 230) that is part of the data gathering and measurement framework. The process 800 starts by deploying (at 810) agents on a set of resource elements in the public cloud. In some embodiments, the set of resource elements implement a tenant deployable resource in the public cloud, such as a firewalls, load balancers, intrusion detection systems, DPIs, or NATs.

The resource elements, in some embodiments, are a second set of resource elements that is identical to a first set of resource elements that already exist in the public cloud. In some embodiments, the controller cluster deploys the second set of resource elements to collect metrics and use the metrics to test the environment (i.e., public cloud environment) and modify the first set of resource elements accordingly. For example, in some embodiments, the first and second sets of resource elements are first and second sets of machines that are similarly configured (i.e., the second set of machines are configured like the first set of machines) deployed on the same or similar host computers in the public cloud. In other embodiments, the resource elements are existing resource elements that are actively serving a particular tenant.

The process communicates (at 820) with the deployed agents to generate performance metrics regarding the set of resource elements. For example, in some embodiments, the controller cluster directs the agents to perform a set of performance-related tests in order to generate the performance metrics. In some embodiments, the controller cluster instructs the agents to perform specific tests to generate specific types of metrics (e.g., based on the type of resource elements in the set), while in other embodiments, the controller cluster instructs the agents to perform a set of default performance tests intended to capture a wide variety of metrics.

As described above, the agents perform the performance-related tests, in some embodiments, by communicating with other agents in other cloud datacenters. In some embodiments, the agents communicate with each other by sending data messages and collecting operational metrics related to the sent, and/or received, data messages. When the resource elements are the second set of resource elements corresponding to the existing first set of resource elements, in some embodiments, the data messages used in the performance tests are data messages similar to those sent and/or received by the existing first set of resource elements. In some embodiments, the data messages are sent to, and received from, other elements both inside of, and external to, the public cloud in which the resource elements are deployed.

The process then analyzes (at 830) the generated performance metrics. Each deployed resource element, in some embodiments, is associated with a guaranteed SLA, and the controller cluster, or a set of designated servers, analyzes the generated performance metrics by comparing guaranteed performance metric values specified by the SLA for the set of resource elements with the generated performance metrics to determine whether the guaranteed performance metric values are being met by the particular resource element. Alternatively, or conjunctively, the controller cluster in some embodiments analyzes the generated performance metrics by comparing them with historical performance metrics retrieved from a database (e.g., database 232) and associated with the set of resource elements and/or associated with other resource elements of the same type to identify fluctuations or changes in performance.

Based on the analysis, the process determines (at 840) whether any modifications to the deployment of the set of resource elements are needed. In some embodiments, for example, the controller cluster may determine that the performance of the set of resource elements has degraded, improved, or remained consistent when compared to historical performance metrics from the database. Similarly, the controller cluster in some embodiments may determine that the performance of the set of resource elements meets, does not meet, or exceeds a guaranteed SLA.

When the process determines (at 840) that no modifications to the deployment of the set of resource elements are needed (i.e., the analysis did not indicate performance issues), the process ends. Otherwise, when the process determines that modifications to the set of resource elements are needed, the process transitions to 850 to modify the deployment of the set of resources based on the analysis. As described above for the process 700, the set of resource elements can be modified by scaling out the number of instances of the resource elements in the set, in some embodiments, and/or by adjusting the placement of the particular resource element (e.g., by placing the particular resource element on another host). In some embodiments, the process 800 modifies the particular resource element by removing the particular resource element and replacing it with a different resource element. The different resource element, in some embodiments, is of a different resource element type, or a different resource element sub-type. Following 850, the process 800 ends.

Figure 9:
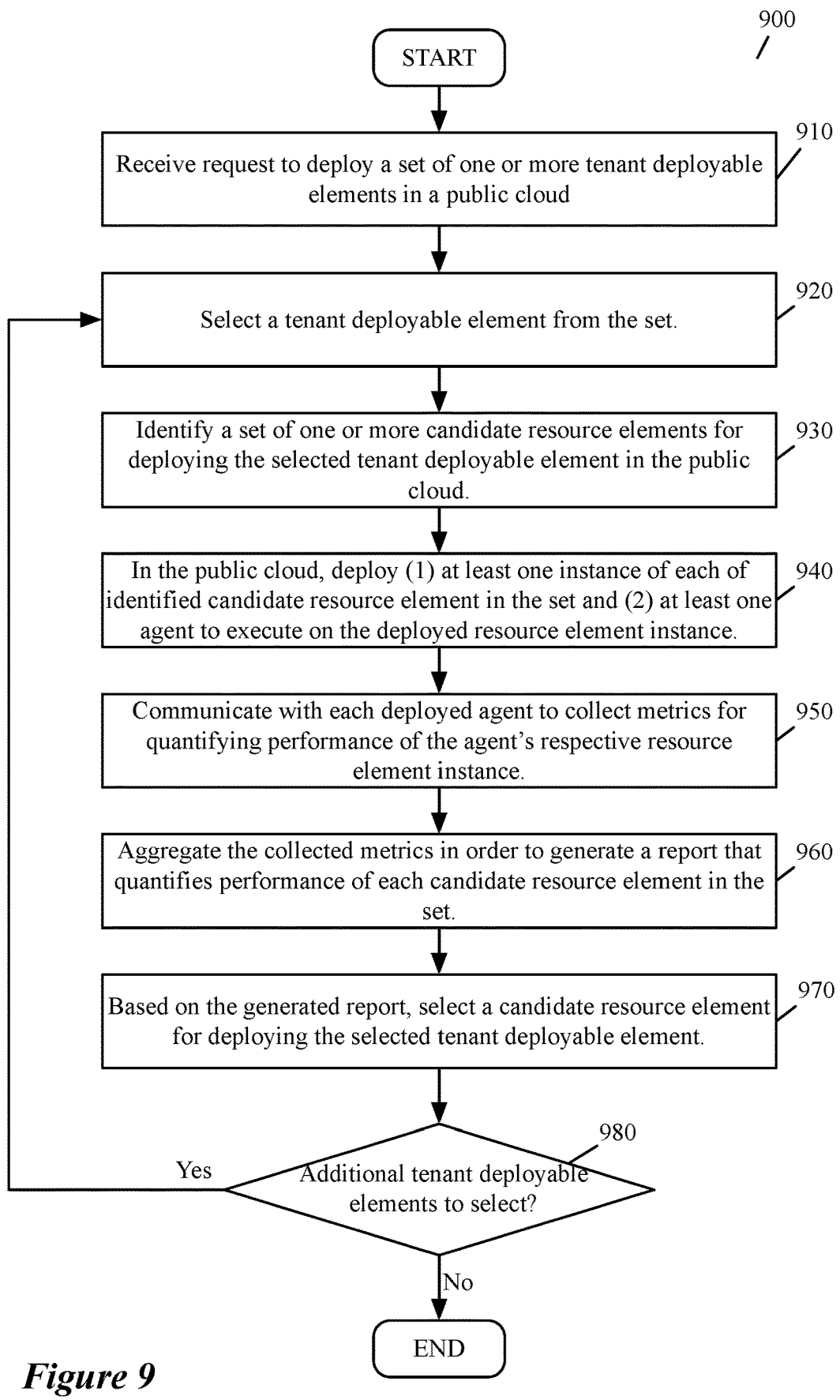
FIG. 9 illustrates a process for evaluating multiple candidate resource elements that are candidates for deploying a set of one more tenant deployable elements in a public cloud, according to some embodiments.

FIG. 9 illustrates a process for evaluating multiple candidate resource elements that are candidates for deploying a set of one more tenant deployable elements in a public cloud, according to some embodiments. In some embodiments, the process 900 is performed by a controller or controller cluster that is part of the data gathering and measurement framework. The process 900 starts by receiving (at 910) a request to deploy a set of one or more tenant deployable elements in a public cloud. The request in some embodiments can be received from a user through a UI provided by the controller cluster, or from a network element, in some embodiments, through a REST endpoint provided by the controller cluster.

The process then selects (at 920) a tenant deployable element from the set, and identifies (at 930) a set of one or more candidate resource elements for deploying the selected tenant deployable element in the public cloud. The candidate resource elements, in some embodiments, include different types of resource elements that are candidates for deploying the selected tenant deployable element. Examples of candidate resource elements of some embodiments include compute resource elements (e.g., virtual machines (VMs), containers, middlebox service, nodes, and pods), networking resource elements (e.g., switches, routers, firewalls, load balancers, and network address translators (NATs)), and storage resource elements (e.g., databases, datastores, etc.).

In some embodiments, the different types of candidate resource elements also include different sub-types of candidate resource elements. For example, the set of candidate resource elements for the selected tenant deployable element can include first and second candidate resource elements that are of the same type, and that perform the same set of operations of the selected tenant deployable element, but are considered different sub-types due to differences in the amounts of resources they consume (i.e., resources of the host computers on which they are deployed in the public cloud). These host-computer-resources in some embodiments include compute resources, memory resources, and storage resources.

In the public cloud, the process deploys (at 940) at least one instance of each of identified candidate resource element in the set and at least one agent to execute on the deployed resource element instance. The deployed agents, in some embodiments, are configured to run performance-related tests on their respective candidate resource elements in order to generate and collect performance-related metrics. In some embodiments, at least one agent is deployed in another cloud (e.g., a private cloud datacenter of the tenant) to allow for cross-cloud performance tests, such as testing the connections per second of a particular candidate resource element. The at least one agent in the other cloud is deployed in the same cloud as the controller cluster, in some embodiments.

The process communicates (at 950) with each deployed agent to collect metrics for quantifying performance of the agent's respective resource element instance. In some embodiments, communicating with the deployed agents includes configuring the agents to perform the tests mentioned above, and to provide metrics collected in associated with these test to the controller cluster. The agents of some embodiments are configured to provide the collected metrics to the controller cluster by recording the metrics to a database accessible to the controller cluster (e.g., as described above for FIG. 2).

The process aggregates (at 960) the collected metrics in order to generate a report that quantifies performance of the agent's respective resource element instance. As described above, the collected metrics, in some embodiments, include metrics such as throughput (e.g., in bits per second, in bytes per second, etc.), packets per second, connections per second, requests per second, transactions per second, transmission controller protocol (TCP) SYN arrival rate, number of open TCP connections, number of established TCP connections, and number of secure socket layer (SSL) transactions. In some embodiments, the controller cluster stores the generated report in a database for later use.

Based on the generated report, the process selects (at 970) a candidate resource element from the set for deploying the selected tenant deployable element. In some embodiments, the controller cluster selects the candidate resource element based on criteria specified in the request to deploy the set of tenant deployable elements, or based on which candidate resource element is the best fit for meeting a guaranteed SLA. The selection, in some embodiments, also includes determining a number of instances of the candidate resource element to deploy for the selected tenant deployable element. Alternatively, or conjunctively, the controller cluster in some embodiments provides the generated report to a user (e.g., to network administrator through the UI) to allow the user to select which candidate resource element to deploy. In some such embodiments, the controller cluster may provide recommendations in the report as to which candidate resource element should be selected.

The process determines (at 980) whether there are any additional tenant deployable elements in the set to select. When the process determines that there are additional tenant deployable elements to select (i.e., for evaluating candidate resource elements for deploying the tenant deployable elements), the process returns to 920 to select a tenant deployable element from the set. Otherwise, when the process determines (at 980) that there are no additional tenant deployable resources in the set to select the process ends.

In some embodiments, rather than, or in addition to evaluating multiple candidate resource elements that are candidates for deploying multiple tenant deployable elements, the controller cluster performs the process 900 to evaluate multiple candidate resource elements for deploying a single tenant deployable element in a single public cloud.

Figure 10:
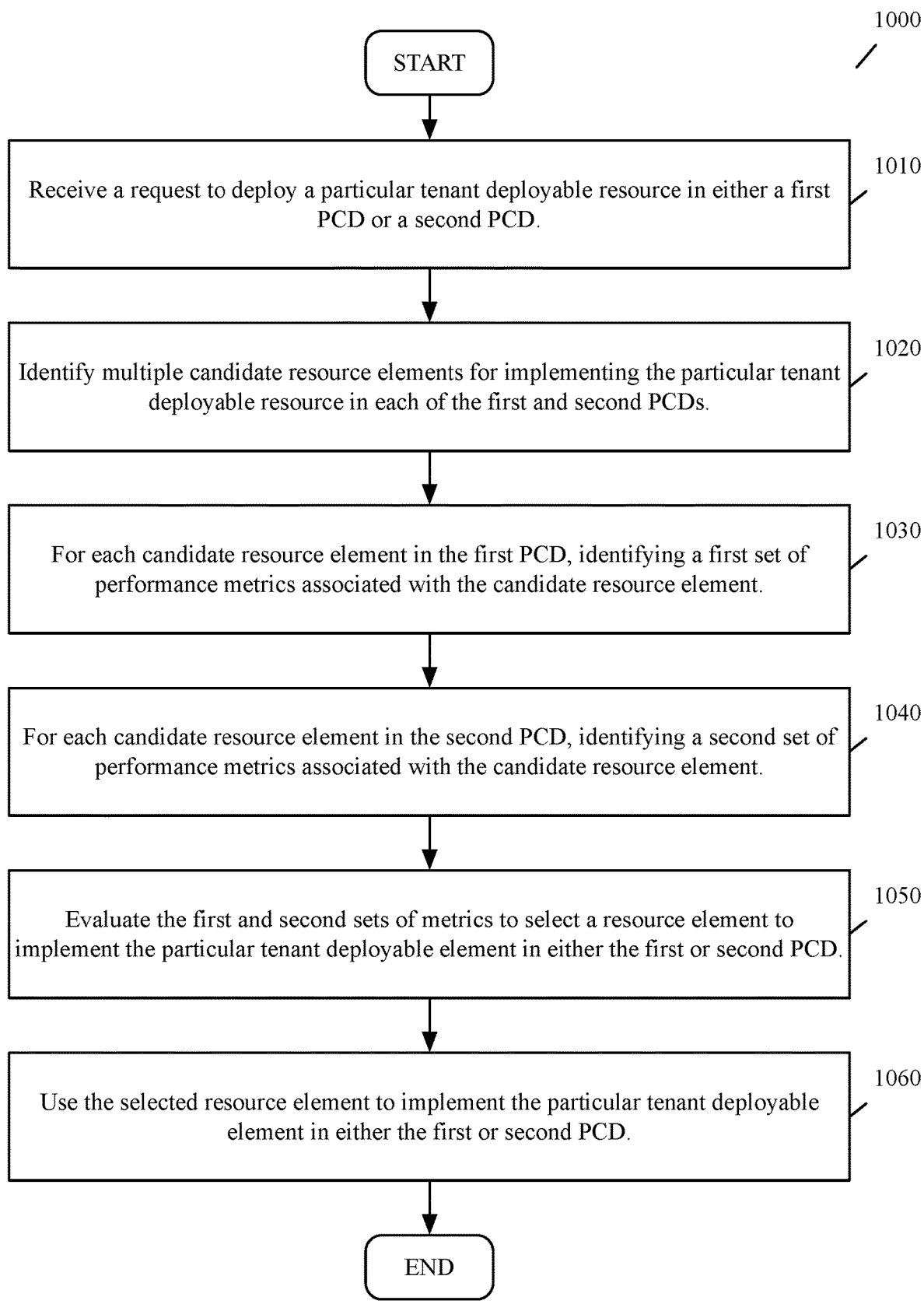
FIG. 10 illustrates a process of some embodiments for deploying resource elements in response to a request to implement a particular tenant deployable element in either a first public cloud datacenter or a second public cloud datacenter.

FIG. 10 illustrates a process of some embodiments for deploying resource elements in response to a request to implement a particular tenant deployable element in either a first public cloud datacenter or a second public cloud datacenter. The process 1000 starts by receiving (at 1010) a request to deploy a particular tenant deployable element in either a first public cloud datacenter or a second public cloud datacenter. As described above, examples of tenant deployable elements in some embodiments include load balancers, firewalls, intrusion detection systems, DPIs, and NATs.

The process identifies (at 1020) multiple candidate resource elements for implementing the particular tenant deployable element in each of the first and second public cloud datacenters. Multiple candidate resource elements exist in each of the first and second public cloud datacenters for the particular tenant deployable element, according to some embodiments, while in other embodiments, only one candidate resource element exists in either one, or both, of the datacenters. In some embodiments, the particular tenant deployable element is a VNF and all of the candidate resource elements are VMs. Alternatively, in some embodiments, the particular tenant deployable element is a cloud-native network function and the candidate resource elements are containers.

For each candidate resource element in the first public cloud datacenter, the process identifies (at 1030) a first set of performance metrics associated with the candidate resource element. For each candidate resource element in the second public cloud datacenter, the process identifies (at 1040) a second set of performance metrics associated with the candidate resource element. The performance metrics associated with the candidate resource elements, in some embodiments, are retrieved by the controller cluster from a database (e.g., the database 232).

In some embodiments, a particular candidate resource element that exists in both the first and second public cloud datacenters may be referred to differently within each public cloud datacenter. In some such embodiments, the controller cluster may include a mapping between the different names of the particular candidate resource element in order to ensure the correct metrics are retrieved. Also, in some embodiments, such as when no performance metrics associated with one or more of the candidate resources are stored in the database, or when the stored metrics do not include current metrics, the controller cluster performs the process 300 to collect performance metrics for each candidate resource element for which no performance metrics are stored.

The process evaluates (at 1050) the first and second sets of metrics to select a candidate resource element to implement the particular tenant deployable element in either the first or second public cloud datacenter. In some embodiments, the controller makes this selection based on which candidate resource element/public cloud datacenter combination has the best overall metrics, while in other embodiments, the controller makes this selection based on which candidate resource element/public cloud datacenter combination has the best metrics compared to a set of desired metrics or other criteria provided with the request to implement the particular tenant deployable resource. The specified criteria, in some embodiments, can include performance criteria (e.g., a specified threshold value or range for a particular performance metric), non-performance criteria (e.g., CSP identifier, region identifier, availability zone identifier, resource element type, time of day, payload size, payload type, and encryption and authentication types), or a combination of both performance and non-performance criteria.

The process then uses (at 1060) the selected resource element to implement the particular tenant deployable element in either the first or second public cloud datacenter. The process then ends. In some embodiments, rather than making the selection itself as part of an automated process, the controller cluster generates a report identifying the performance metrics associated with the candidate resource elements and provides the report to a user (e.g., to a network administrator through a UI) to enable the user to manually make a selection. The controller cluster in some embodiments may provide recommendations in the report as to which candidate resource element should be selected. In some such embodiments, the controller cluster receives an identifier of the user-selected resource element through the UI.

Figure 11:
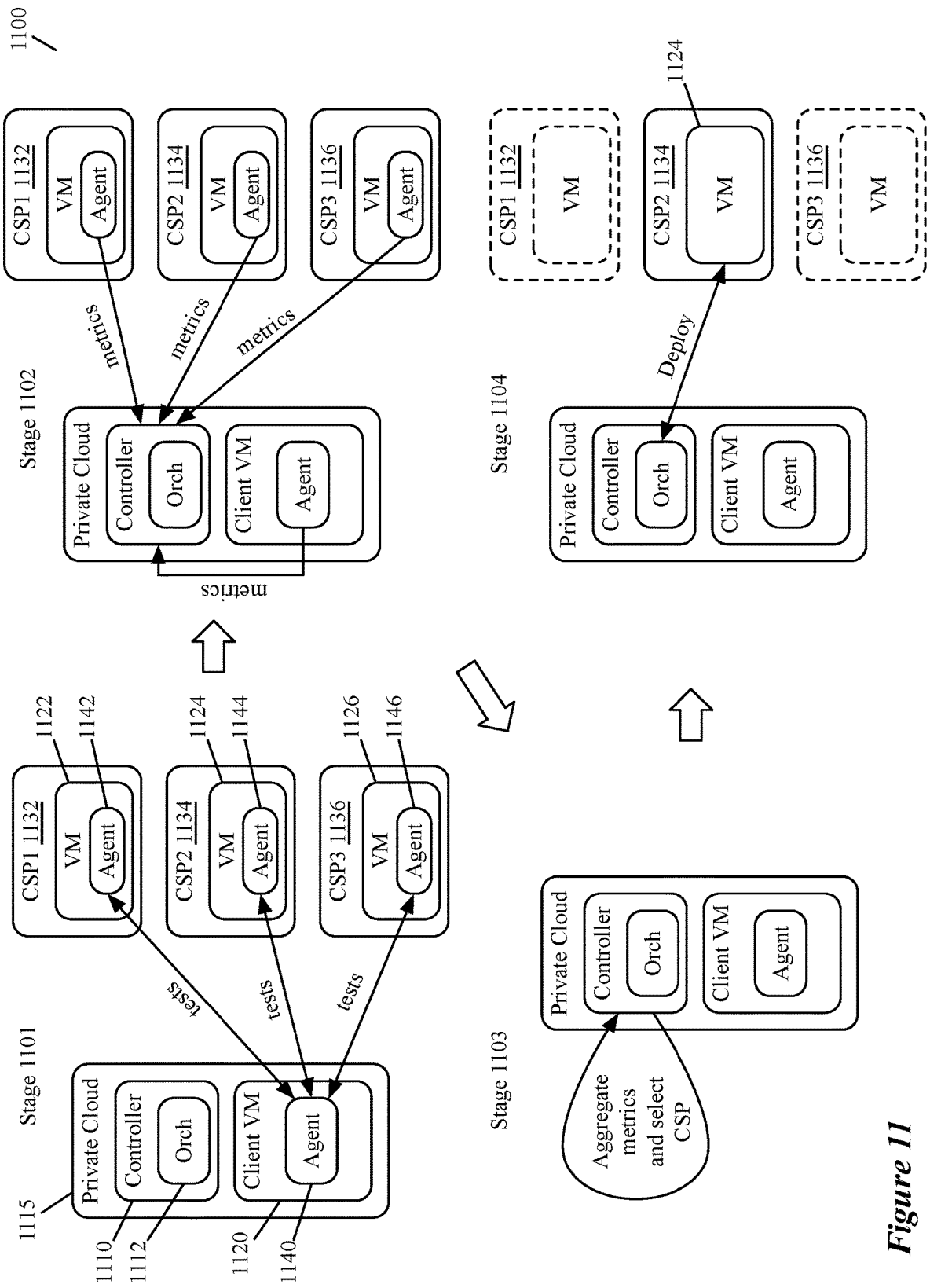
FIG. 11 illustrates a series of stages of some embodiments as a data gathering and measurement framework performs tests to select a public cloud from a set of public clouds provided by different CSPs for deploying a resource element.

FIG. 11 illustrates a series of stages 1100 as a data gathering and measurement framework performs tests to select a public cloud from a set of public clouds provided by different CSPs for deploying a resource element. In the first stage 1101, an agent 1140 on a client VM 1120 executing in a private cloud 1115 communicates with a set of agents deployed on instances of a VM in three different cloud datacenters provided by three different CSPs in order to run performance-related tests to measure the performance of the VM in each of the different cloud datacenters. As shown, the set of agents on the VM instances in the different cloud datacenters include agent 1142 on VM instance 1122 in cloud datacenter 1132, agent 1144 on VM instance 1124 in cloud datacenter 1134, and agent 1146 on VM instance 1126 in cloud datacenter 1136. The different cloud datacenters 1132-1136 are public cloud datacenters, in some embodiments, while in other embodiments, they are private cloud datacenters or a mix of public and private cloud datacenters.

In the second stage 1102, each of the agents 1140-1146 are shown providing metrics (i.e., performance metrics collected by the agents during the test in stage 1101) to the controller 1110. While not shown, the agents in some embodiments provide the metrics to the controller by recording the metrics in a database accessible to the controller, as also described in some of the embodiments above. Also, while illustrated as being co-located in the same private cloud 1115, the controller 1110 and the client VM 1120 in other embodiments execute in different locations (e.g., different clouds, different datacenters, etc.). In still other embodiments, the controller 1110 executes in one of the cloud datacenters 1132-1136. Additionally, while this example illustrates VM instances being deployed, other embodiments can include other types of resource elements, such as containers and pods.

Next, the controller aggregates the received metrics in stage 1103 in order to select one of the cloud datacenters provided by one of the CSPs for deploying the VM (i.e., resource element). Finally, in stage 1104, the orchestration component 1112 of the controller 1110 deploys the VM instance 1124 in the selected cloud datacenter 1134, while the remaining cloud datacenters are illustrated with dotted lines to indicate they were not selected for deploying the VM instance.

Figure 12:
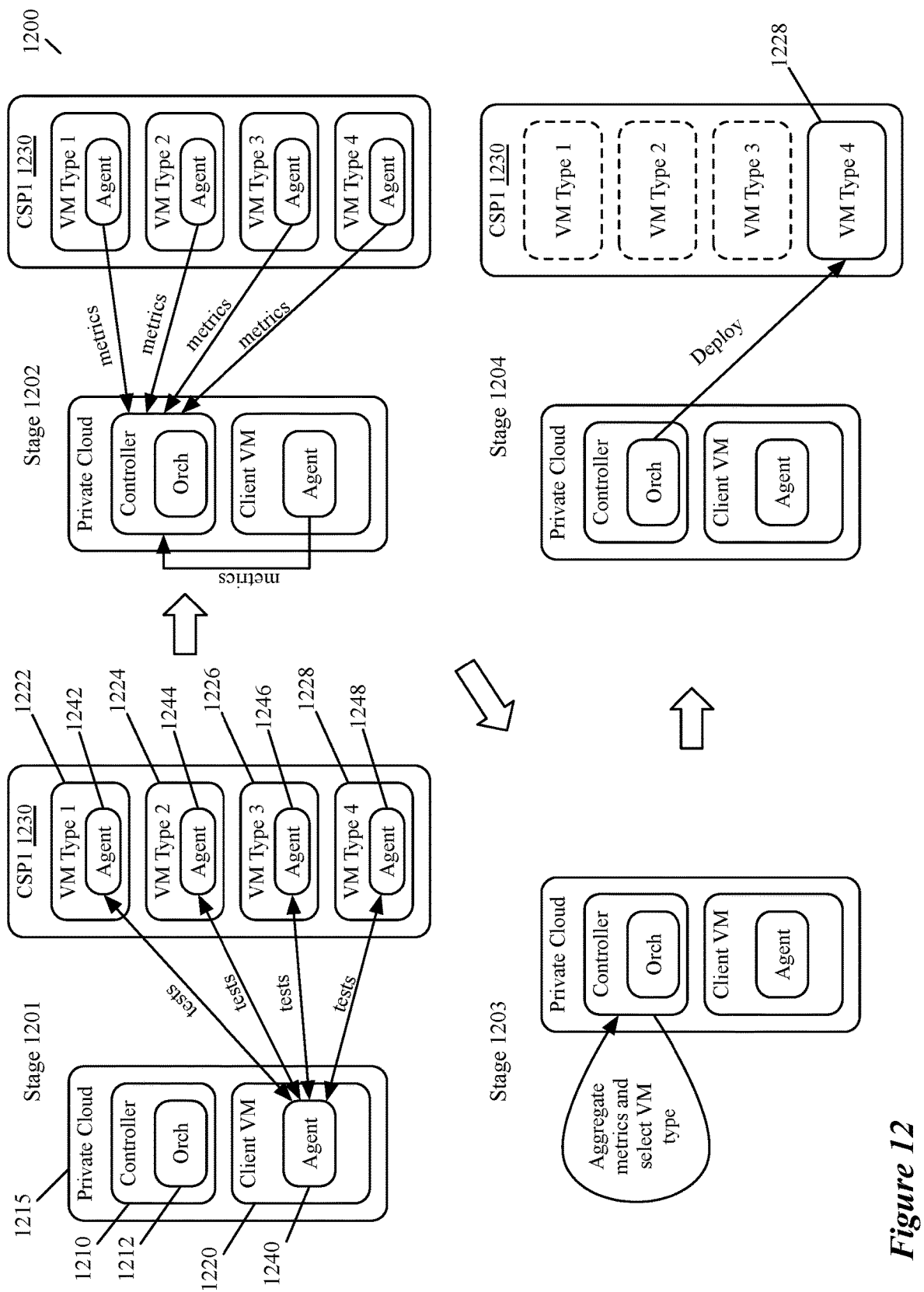
FIG. 12 illustrates a series of stages as a data gathering and measurement framework performs tests to select a resource element type from a set of resource element types for deployment in a cloud datacenter, according to some embodiments.

Similar to FIG. 11, FIG. 12 illustrates a series of stages 1200 as a data gathering and measurement framework performs tests to select a resource element type from a set of resource element types for deployment in a cloud datacenter 1230. In the first stage 1201, an agent 1240 on a client VM 1220 in a private cloud 1215 is shown communicating with four agents each executing on a VM instance of a different type in a datacenter 1230 provided by a particular CSP. For example, the agent 1240 is shown communicating with an agent 1242 on a VM instance of a first type 1222, an agent 1244 on a VM instance of a second type 1224, an agent 1246 on a VM instance of a third type 1226, and an agent 1248 on a VM instance of a fourth type 1228.

The resource element types in some embodiments include a variety of resource element types, while in other embodiments, the resource element types are resource element sub-types defined by an amount of resources consumed by the resource element (i.e., resources of the host computer on which the resource element executes). Examples of consumable resources include processing resources, storage resources, and memory resources, according to some embodiments. Accordingly, while the resource element instance types described in this example are illustrated and described as sub-types of VMs (i.e., VMs that consume different amounts of host-computer-resources), other embodiments include sub-types of other resource element types (e.g., sub-types of containers), while still other embodiments include a variety of different resource element types and resource element sub-types (e.g., a combination of VM instance sub-types and container instance sub-types).

In some embodiments, the resource element types depend on the type of tenant deployable element that the resource elements are implementing, and/or the types of operations performed by the tenant deployable element. For example, the tenant deployable element can be a workload or service machine, a forwarding element that has to be deployed on a machine executing on a host computer or deployed as a forwarding appliance, or a middlebox service element.

In the second stage 1202, each of the agents 1240-1248 are shown providing metrics (i.e., metrics collected during the tests in stage 1201) to the controller 1210 in the private cloud 1215. As described above for FIG. 11, the agents in some embodiments provide the metrics to the controller by recording the metrics to a database accessible to the controller. Also, while the controller is illustrated as executing in the private cloud 1215, the controller in other embodiments can be located in other clouds or datacenters, including the cloud datacenter 1230, in some embodiments.

In the next stage 1203, the controller aggregates the metrics received from the agents in order to select a VM type to deploy in the cloud datacenter 1230. In some embodiments, the controller aggregates the metrics and generates a report identifying the selected VM type and stores the report in the database for later use (e.g., to respond to queries for metrics). Also, in some embodiments, the controller provides the aggregated metrics to users through a UI (e.g., the UI 232 of the controller 200 described above) in response to users subscribing to receive metrics and reports.

In the final stage 1204, the orchestration component 1212 of the controller 1210 deploys a VM instance 1228 of the selected VM type 4 in the cloud datacenter 1230, while the other VM types are illustrated with dashed outlines to indicate these types were not selected for deployment. While only one instance of the VM 1228 is shown, multiple instances of the selected VM type are deployed in some embodiments.

As mentioned above for FIG. 7, some embodiments use the data gathering and measurement framework to evaluate different types of resource elements. For instance, to evaluate different types of resource elements when trying to deploy a web server, some embodiments use the framework to assess different sub-types of web servers to be deployed. In some embodiments, the different sub-types are defined by the amount of resources consumed (i.e., resources of the host computer on which the resource element operates). Higher priority resource elements are allocated more resources to consume, in some embodiments, while lower priority resource elements are allocated fewer resources to consume.

Figure 13:
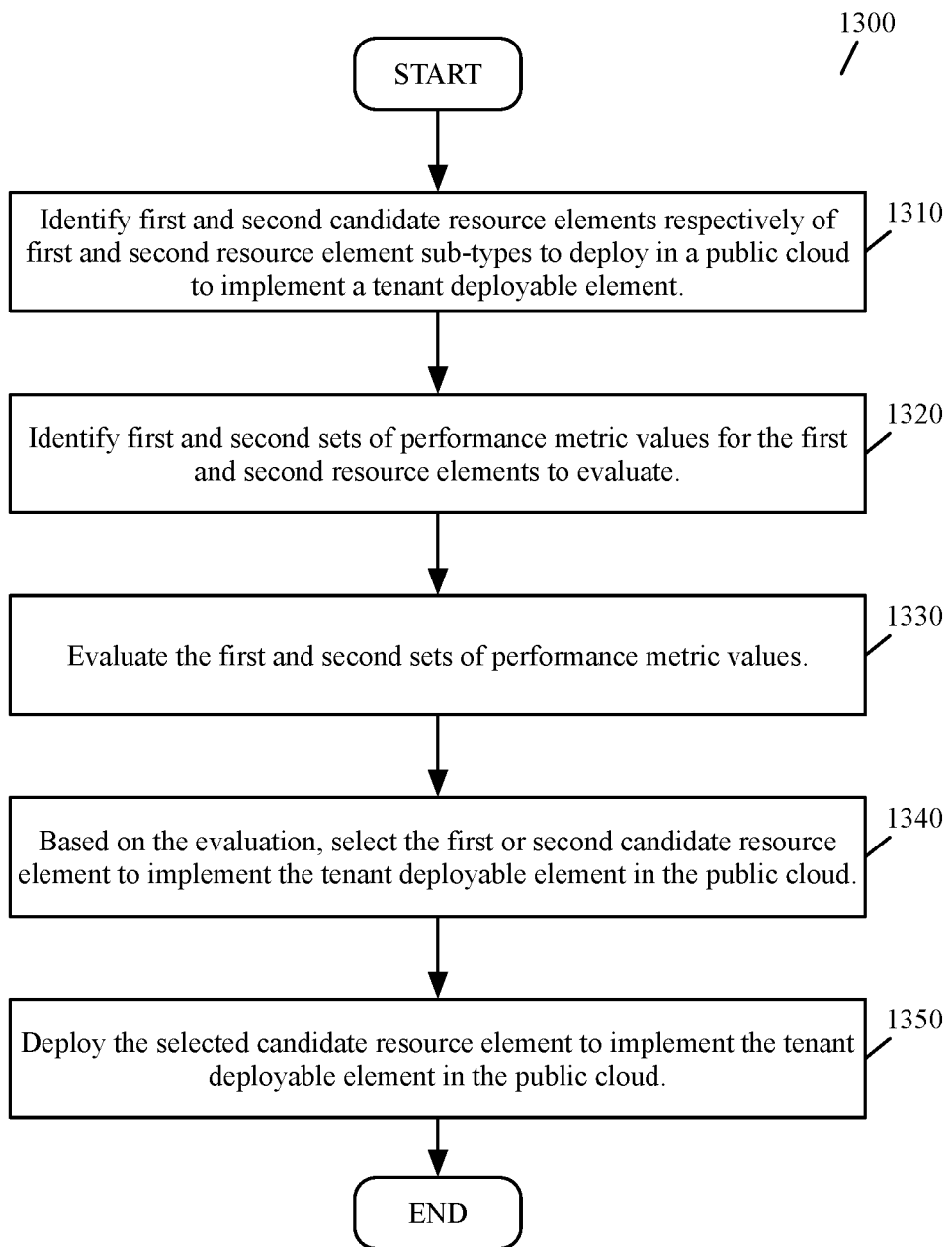
FIG. 13 illustrates a process for selecting a candidate resource element to deploy in a public cloud to implement a tenant deployable element, according to some embodiments.

FIG. 13 illustrates a process for selecting a candidate resource element of a particular sub-type to deploy in a public cloud to implement a tenant deployable element, according to some embodiments. The process 1300 is performed in some embodiments by a controller, controller cluster, or set of servers. The process 1300 starts by identifying (at 1310) first and second candidate resource elements respectively of first and second resource element sub-types to deploy in a public cloud to implement a tenant deployable element. The first and second candidate resource element sub-types are resource elements of the same type, but that consume different amount of resources on the host computer on which they execute. For example, the candidate resource elements in some embodiments are two VMs that consume different amounts of processing resources of the host computer.

The process identifies (at 1320) first and second sets of performance metric values for the first and second resource elements to evaluate. The first and second sets of performance metric values, in some embodiments, are metric values of the same metric types and are retrieved from a database by the controller cluster. In some embodiments, the controller cluster performs the process 900 in order to collect metric values for the candidate resource elements when there are no metric values associated with the candidate resource elements in the database.

The process evaluates (at 1330) the first and second sets of performance metric values. In some embodiments, the controller evaluates the first and second sets of performance metric values by comparing them to each other. Also, in some embodiments, the controller cluster compares the sets of performance metric values with a guaranteed SLA, or other criteria (e.g., other criteria specified in a request to deploy the tenant deployable element).

Based on this evaluation, the process selects (at 1340) the first or second candidate resource element to implement the tenant deployable element in the public cloud. The selected candidate resource element, in some embodiments, is the candidate resource element having the closest performance metrics to those specified in the guaranteed SLA, while in other embodiments, the selected candidate resource element is the candidate resource element that best matches the criteria specified in the request. In still other embodiments, the selected candidate resource element is the candidate resource element with the overall best performance metric values. Also, in some embodiments, the controller cluster provides the evaluated performance metrics to a user in the form of a report through a UI to enable the user to make the selection. The report, in some embodiments, includes a suggestion for which candidate resource element should be selected. In some embodiments, the controller cluster receives an identifier of the user-selected candidate resource element through the UI. The process then deploys (at 1350) the selected candidate resource element to implement the tenant deployable element in the public cloud. Following 1350, the process ends.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
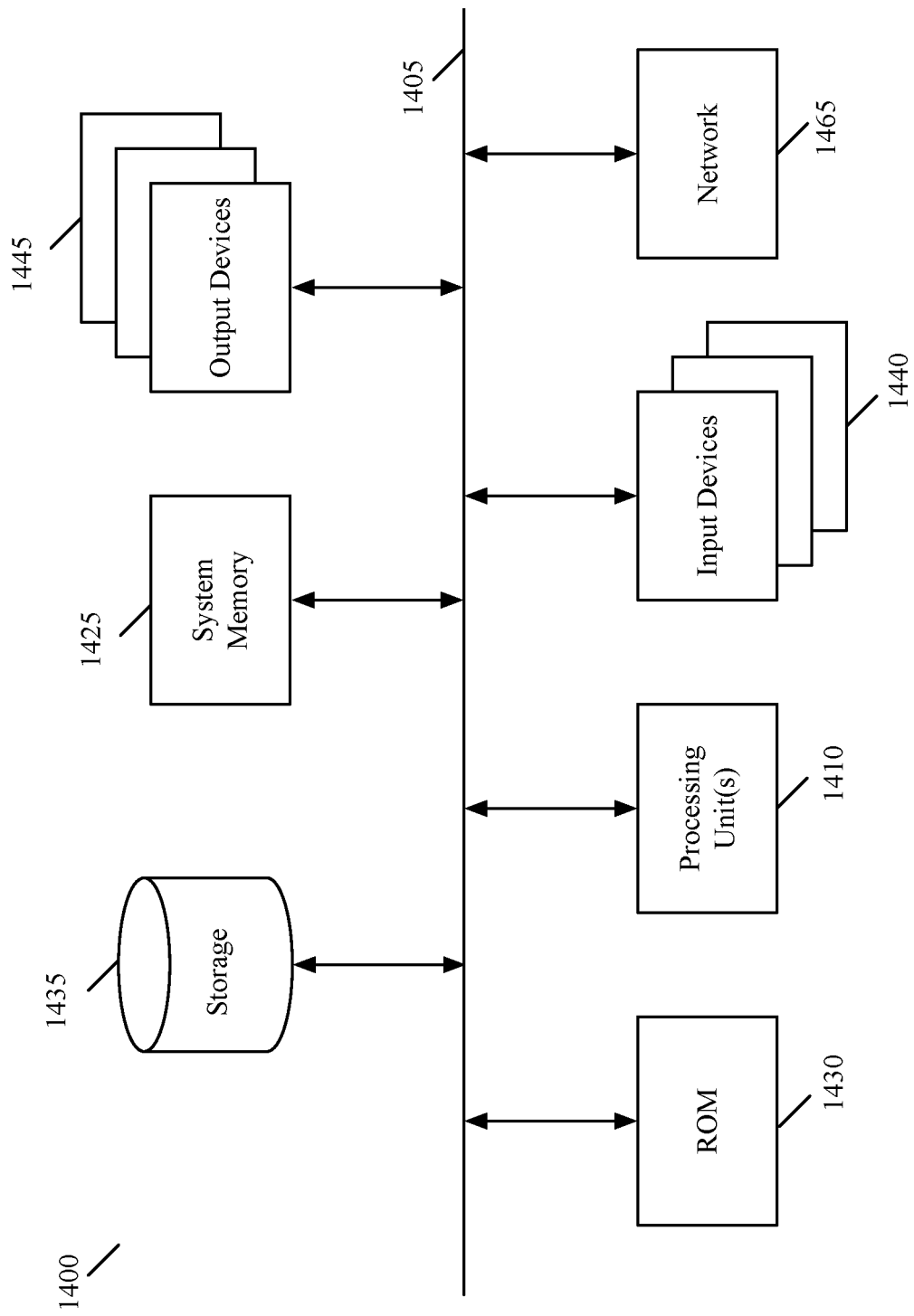
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, gateway and edge forwarding elements. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such as random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the computer system. The input devices 1440 include alphanumeric keyboards and pointing devices (also called "cursor control devices"). The output devices 1445 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 14, bus 1405 also couples computer system 1400 to a network 1465 through a network adapter (not shown). In this manner, the computer can be a part of a network of computers (such as a local area network ("LAN"), a wide area network ("WAN"), or an Intranet), or a network of networks (such as the Internet). Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of deploying tenant deployable elements on resource elements in public cloud datacenters, the method comprising:
   receiving a request to deploy a particular tenant deployable element in one of a first public cloud datacenter (PCD) and a second PCD, wherein the first public cloud datacenter belongs to a first cloud service provider (CSP) and the second public cloud datacenter belongs to a second CSP;
   for each candidate resource element in the first PCD, identifying a first set of performance metrics associated with the candidate resource element;
   for each candidate resource element in the second PCD, identifying a second set of performance metrics associated with the candidate resource element;
   evaluating the identified first and second sets of performance metrics to generate a report identifying various candidate resource elements to implement the particular tenant deployable element and their associated identified sets of performance metrics, and comprising a recommendation as to which candidate resource element in which PCD should be selected to implement the particular tenant deployable element;
   providing the report to a network administrator for evaluation through a user interface (UI);
   receiving selection of a resource element in the report to implement the particular tenant deployable element in one of the first and second PCDs; and
   using the selected resource element to implement the particular tenant deployable element in one of the first and second PCDs.

2. The method of claim 1, wherein a plurality of candidate resource elements exists in each PCD for the particular tenant deployable element.

3. The method of claim 1, wherein only one candidate resource element exists in each PCD for the particular tenant deployable element.

4. The method of claim 1, wherein a plurality of candidate resource elements exists in the first PCD, while only one candidate resource element exists in the second PCD, for the particular tenant deployable element.

5. The method of claim 1, wherein the particular tenant deployable element is a virtual network function (VNF) and the candidate resource elements are virtual machines.

6. The method of claim 1, wherein the particular tenant deployable element is a cloud native network function and the candidate resource elements are containers.

7. The method of claim 1, wherein identifying the first and second sets of metrics comprises retrieving the first and second sets of metrics for each candidate resource element from a database that stores a plurality of metrics associated with a plurality of resource elements deployed in each of a plurality of public cloud datacenters.

8. The method of claim 1, wherein identifying the first set of metrics comprises performing a data collection operation to collect the first set of metrics associated with a set of candidate resource elements in the first PCD, the performing of the data collection operation comprises collecting the first set of metrics from a set of measurement agents that are deployed in the first PCD for one or more candidate resource elements that are deployed in the first PCD in order to collect performance metrics.

9. The method of claim 1, wherein the received request specifies a set of criteria for selecting a candidate resource element to implement the particular tenant deployable element.

10. The method of claim 9, wherein the set of criteria comprises one or more desired values for one or more performance metrics, wherein evaluating the identified sets of metrics comprises comparing each identified set of metrics with the one or more desired values for the one or more performance metrics.

11. The method of claim 10, wherein evaluating the identified sets of metrics further comprises comparing the collected sets of metrics with each other.

12. The method of claim 10, wherein the identified set of metrics comprise at least two of (i) throughput per second, (ii) packets per second, (iii) connections per second, (iv) requests per second, (v) transactions per second, (vi) transmission control protocol (TCP) SYN arrival rate, (vii) number of open TCP connections, and (viii) number of established TCP connections.

13. The method of claim 10, wherein
each set of identified metrics is associated with metadata attributes including two or more of: CSP identifier, region identifier, availability zone identifier, resource element type, time of day, payload size, payload type, and encryption and authentication types, and
the evaluating the identified sets of metrics further comprises comparing the metadata attributes of the identified metrics with the received set of criteria for selecting the candidate resource element.

14. The method of claim 1, wherein the request is a first request, the particular tenant deployable element is a first tenant deployable element, the method further comprising:

receiving a second request to deploy a second tenant deployable element in one of a plurality of PCDs including the first and second PCDs;

for each resource element in each PCD that is a candidate for deploying the second tenant deployable element, identifying a set of performance metrics associated with the candidate resource element;

evaluating the identified sets of metrics to select a resource element to implement the second tenant deployable element in one of the PCDs; and using the resource element selected for second tenant deployable element to implement the particular tenant deployable element in one of the PCDs.

15. The method of claim 14, wherein the received first request specifies a first set of criteria for deploying the first tenant deployable element and the received second request specifies a second set of criteria for deploying the second tenant deployable element, each set of criteria comprising at least one performance criteria for the tenant element that is to be deployed, said performance criteria used to perform the evaluation of the sets of metrics.

16. The method of claim 15, wherein each set of criteria further comprises at least one non-performance criteria, said non-performance criteria including at least one of CSP identifier, region identifier, availability zone identifier, resource element type, time of day, payload size, payload type, and encryption and authentication types, said non-performance criteria also used to perform the evaluation of the sets of metrics.

17. The method of claim 1, wherein the identifying, evaluating and using operations area performed by an automated process that automatically deploys a tenant element in one of the PCDs.

18. The method of claim 1, wherein the method is performed by a set of servers executing in one of the PCDs or another datacenter, wherein the request is received from the network administrator through a user interface (UI) provided by a controller.

19. The method of claim 1, wherein the method is performed by a set of servers executing in one of the PCDs or another datacenter, wherein the request is received through a REST API (Application Programming Interface) provided by a controller.

* * * * *